(12) United States Patent
Usrey

(10) Patent No.: US 6,366,890 B1
(45) Date of Patent: Apr. 2, 2002

(54) PRODUCT INVENTORY CATEGORY MANAGEMENT AND VARIETY OPTIMIZATION METHOD AND SYSTEM

(76) Inventor: Gerald L. Usrey, 1008 Tinker Rd., Colleyville, TX (US) 76034

( * ) Notice: Subject to any disclaimer, the term of this patent is extended or adjusted under 35 U.S.C. 154(b) by 0 days.

(21) Appl. No.: 09/032,040

(22) Filed: Feb. 27, 1998

(51) Int. Cl.[7] .............................................. G06F 17/60
(52) U.S. Cl. ............................. 705/10; 705/28; 705/29
(58) Field of Search .......................... 705/28, 29, 412, 705/23, 7, 10, 22; G06F 15/20, 15/21, 17/60, 123/00

(56) References Cited

U.S. PATENT DOCUMENTS

| | | | |
|---|---|---|---|
| 4,112,598 A | 9/1978 | Maass et al. ................. 434/430 |
| 4,639,875 A | 1/1987 | Abraham et al. .............. 705/28 |
| 4,642,780 A | 2/1987 | Thomson ................ 395/500.01 |
| 4,654,800 A | 3/1987 | Hayashi et al. ................ 705/28 |
| 4,737,910 A | 4/1988 | Kimbrow ....................... 705/28 |
| 4,783,740 A | 11/1988 | Ishizawa et al. ............... 705/28 |
| 4,797,819 A | 1/1989 | Dechirot ....................... 705/28 |
| 4,947,322 A | 8/1990 | Tenma et al. ................... 705/8 |
| 4,972,318 A | 11/1990 | Brown et al. .................. 705/26 |
| 5,128,861 A | 7/1992 | Kagami et al. ................ 705/10 |
| 5,237,496 A | 8/1993 | Kagami et al. ................ 705/10 |
| 5,313,392 A | 5/1994 | Temma et al. ................. 705/27 |
| 5,596,493 A | * 1/1997 | Tone et al. ..................... 705/10 |
| 5,615,109 A | 3/1997 | Eder ............................. 705/8 |
| 5,689,596 A | * 11/1997 | Gibbons et al. ............... 707/1 |
| 5,765,143 A | * 6/1998 | Sheldon et al. ............... 705/28 |
| 5,953,707 A | * 9/1999 | Huang et al. .................. 705/10 |
| 5,956,693 A | * 9/1999 | Geerlings ...................... 705/14 |
| 6,029,139 A | * 2/2000 | Cunningham et al. ......... 705/10 |
| 6,078,891 A | * 6/2000 | Riordan et al. ............... 705/10 |

FOREIGN PATENT DOCUMENTS

| | | | | |
|---|---|---|---|---|
| EP | 770967 A2 | * | 5/1997 | ............ G06F/17/60 |
| JP | 7056890 A | * | 1/1992 | ............ G06F/17/60 |
| JP | 404000596 A | * | 1/1992 | ............ G06F/17/60 |
| WO | WO 0038122 | * | 1/1992 | ............ G06F/17/60 |
| WO | WO009218939 A1 | * | 10/1992 | ............ G06F/17/60 |

OTHER PUBLICATIONS

RD 435,156, Jul. 2000, Derwent, IBM Corp.*

* cited by examiner

Primary Examiner—Vincent Millin
Assistant Examiner—Cuong H. Nguyen
(74) Attorney, Agent, or Firm—The Law Offices of D. Scott Hemingway; D. Scott Hemingway

(57) ABSTRACT

In the field of retail product sales, a retail store would like to identify the most popular products in the market to make sure the product assortment of the store carries those popular products. By focusing on the most popular varieties of products and decreasing the exposure of the least popular varieties of products, a retail store can optimize its assortment selection and increase its profits and sales. The present invention supports the optimization of a retail product selection in a computerized system for categorizing products in inventory, determining market demand for products in the market, and optimizing the variety of products in inventory based upon retail sales data for a geographic region and a chain of stores. With the present method and system, a significant amount of retail sales data is manipulated into an easy to understand format for product category management and variety optimization.

148 Claims, 36 Drawing Sheets

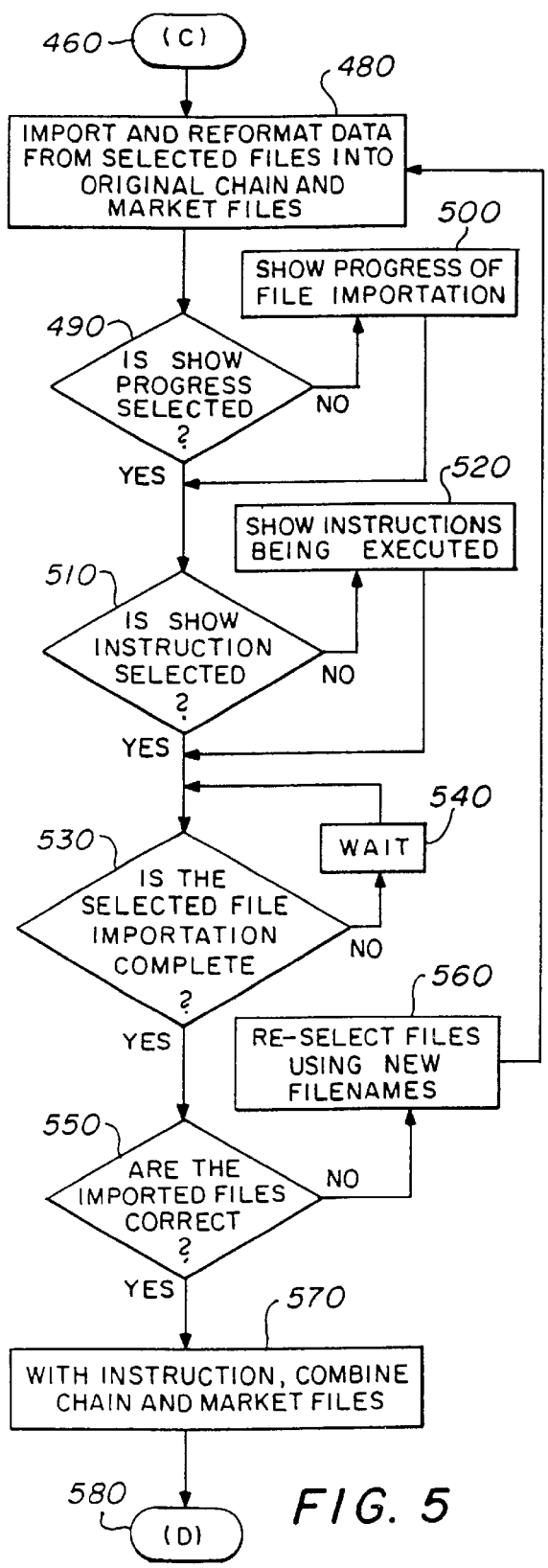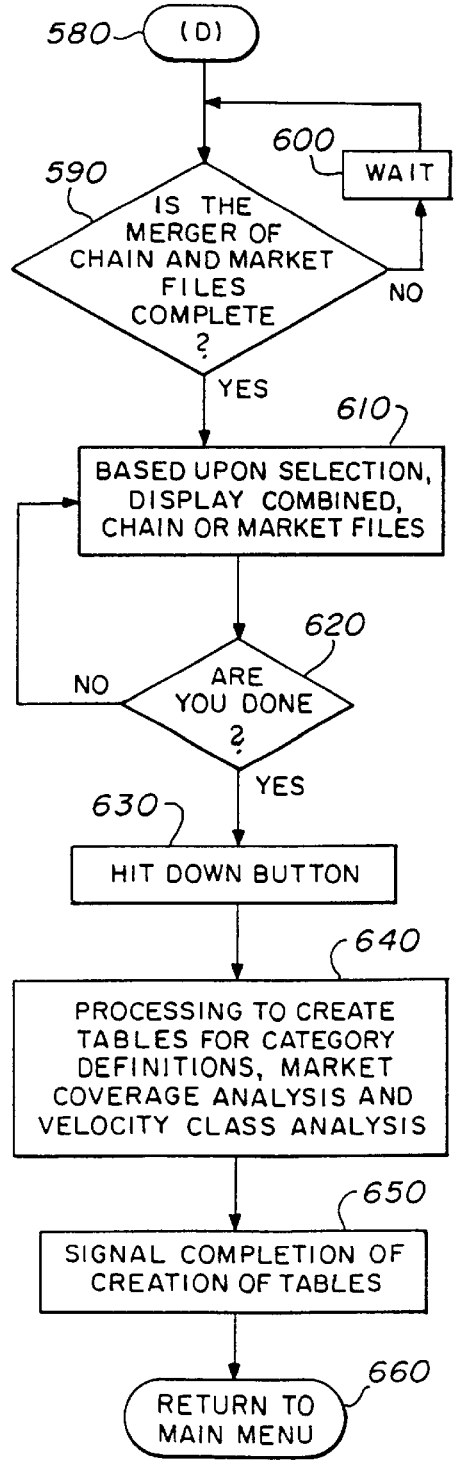
FIG. 5
FIG. 6

CATEGORY DEFINITION – RETAIL CHAIN STORE IN MARKET GEOGRAPHY FOR 12 WKS –12-2

INCLUDED

- CHEEPUFF
- CORNCHIP
- POPCORN
- POTACHIP
- PRETZELS
- TORTCHIP
- VARIPACK

⦿ SUBCATEGORY
○ PACKAGE TYPE
○ VENDOR
○ BRAND
○ FLAVOR BASE
○ SIZE RANGE

EXCLUDED

COMBINED INTO NEW SEGMENT

ALLOTHER <<ALLOTHSN <<SUBCATEGORY
ALLOTHER <<MULGRASN <<SUBCATEGORY
ALLOTHER <<ON1&GASN <<SUBCATEGORY
ALLOTHER <<PARTYMIX <<SUBCATEGORY
ALLOTHER <<PORKRIND <<SUBCATEGORY
ALLOTHER <<POTASTIC <<SUBCATEGORY

[EXCLUDE] [COMBINE...]   [UNDO] [EXCEPTION...]   [UNDO] [EXCEPTION...]

SUMMARY

|  | DOLLAR SALES | PERCENT OF TOTAL |
|---|---|---|
| EXCLUDED | $0.00 | 0.00% |
| COMBINED | $0.00 | 0.00% |
| INCLUDED | $54,777,133.00 | 100.00% |

☐ SHOW GRAPH

[APPLY...] [UNDO ALL] [RECAP...] [HELP]
[DONE]

FIG. 13

CATEGORY DEFINITION RECAP- RETAIL CHAIN STORE IN MARKET GEOGRAPHY FOR 12 WKS

| SEGMENT | INITIAL COUNT | ACTIVE COUNT | INITIAL SALES | ACTIVE SALES | INITIAL %TOTAL MARKET | ACTIVE %TOTAL |
|---|---|---|---|---|---|---|
| ALLOTHER | | 199 | | 3,361,448 | 1.2% | |
| ALLOTHSN | 31 | | 670,356 | | 5.3% | |
| CHEEPUFF | 100 | 100 | 2,926,801 | 2,926,801 | 2.1% | |
| CORNCHIP | 46 | 46 | 1,171,305 | 1,171,305 | | |
| EXCLUDED | | | | | 1.0% | |
| MULGRASN | 10 | | 536,712 | | 0.3% | |
| ONI&GASN | 12 | | 174,746 | | 2.6% | |
| PARTYMIX | 79 | | 1,440,681 | | 5.1% | |
| POPCORN | 169 | 169 | 2,802,727 | 2,802,727 | 0.4% | |
| PORKRIND | 37 | | 201,896 | | 34.2% | |
| POTACHIP | 391 | 391 | 18,733,894 | 18,733,894 | 0.6% | |
| POTASTIC | 30 | | 337,057 | | 20.3% | |
| PRETZELS | 308 | 308 | 11,105,739 | 11,105,739 | 22.7% | |
| TORTCHIP | 207 | 207 | 12,455,611 | 12,455,611 | 4.1% | |
| VARIPACK | 10 | 10 | 2,219,608 | 2,219,608 | | |

RECORD: 1 OF 15

SORT: SEGMENT

● ASCENDING  ○ DESCENDING

☐ SHOW GRAPHS

[DONE] [PREVIEW REPORT] [HELP]

FIG. 14

MARKET COVERAGE ANALYSIS-RETAIL CHAIN STORE IN MARKET GEOGRAPHY

| ABBREVIATION | DESCRIPTION | SEGMENT | REPORT SEQUENCE |
|---|---|---|---|
| PC | POTATO CHIPS | POTACHIP | 1 |
| TC | TORTILLA CHIPS | TOPTCHIP | 2 |
| PZ | PRETZELS | PRETZELS | 3 |
| CP | CHEES PUFFS | CHEEPUFF | 4 |
| PC | POP CORN | POPCORN | 5 |
| VP | VARIETY PACK | VARIPACK | 6 |
| PM | PARTY MIX | PARTYMIX | 7 |
| CC | CORN CHIP | CORNCHIP | 8 |
| AO | ALL OTHER SNACKS | ALLOTHSN | 9 |
| MG | MULTIGRAIN SNACKS | MULGRASN | 10 |
| PS | POTATO STICKS | POTASTIC | 11 |
| PR | PORK RIND | PORKRIND | 12 |

\* ALL STORE BRANDS EXCLUDED FROM ANALYSIS

[ EDIT SEGMENT... ]   [ DEFAULT SEQUENCE ]

☒ SHOW NON-STOCKED ITEMS

[ ADVANCED SORT... ]   [ UNDO SORT ]

SELECT REPORT
○ SUMMARY
○ DETAIL TABLE OF CONTENTS
● DETAIL

[ VIEW ] [ PRINT ] [ PRINT, THEN VIEW ] [ PRINT ALL ]

[ DONE ] [ HELP ]

FIG. 16

ADVANCED SORT

SORT BY
[ SEGMENT ▼ ]  ● ASCENDING  ○ DESCENDING

THEN BY
[ BRAND ▼ ]  ● ASCENDING  ○ DESCENDING

THEN BY
[ ▼ ]  ● ASCENDING  ○ DESCENDING

THEN BY
[ ▼ ]  ● ASCENDING  ○ DESCENDING

THEN BY
[ ▼ ]  ● ASCENDING  ○ DESCENDING

[ OK ]  [ CANCEL ]  [ HELP ]

RETAIL CHAIN STORE
SALES VELOCITY CLASS DEFINITION

| | VELOCITY CLASS | MAXIMUM AVG WEEKLY UNIT SALES PER STORE HANDLING |
|---|---|---|
| SMALLEST | 7 | 1 |
| | 6 | 2 |
| | 5 | 4 |
| | 4 | 8 |
| | 3 | 16 |
| | 2 | 32 |
| LARGEST | 1 | 32+ |

RETAIL CHAIN STORE
SALES PROFILE OF THE AVERAGE STORE

| | |
|---|---|
| NO. SALTY SNACK SKUs STOCKED | 299 |
| AVG. RETAIL REVENUE PER SKU | $1.49 |
| AVG. WEEKLY UNITS SOLD PER SKU | 8.2 |
| AVG. WEEKLY SALES PER SKU | $12.19 |
| TOTAL UNIT SALES VOLUME | 2,451 |
| TOTAL WEEKLY DOLLAR STORES | $3,640 |

ENORMOUS DIFFERENCES EXIST BETWEEN SKUs!

ASSORTMENT PLANNER – RETAIL CHAIN STORE IN MARKET GEOGRAPHY FOR 12 WKS – 12-28

SCENARIO [ASSORTMENT RECOMMENDATIONS ▼]  [NEW SCENARIO...]  [DELETE SCENARIO...]

SEGMENT [CHEESE PUFFS]
◉ ALL ITEMS   ○ ADDED ITEMS   ○ DELISTED ITEMS   [ADVANCED SORT...]   ○ STOCKED ITEMS   ○ NON-STOCKED ITEMS

| FLAVOR | SIZE | $/MM INDEX | V-CLASS | % STORES | $/STORE | STATUS | ITEM DESCRIPTION |
|---|---|---|---|---|---|---|---|
| BAKED | SMALL | 198 | 4 | 2.1 | 1.48 | STOCKED | BCHJX CHSNK CHCH |
| BAKED | SMALL | 180 | | | | NON-STOCKED | HERRS CHSNK CHS |
| BAKED | SMALL | 163 | 4 | 10.6 | 4.52 | STOCKED | BCHJX CHSNK CHCH |
| BAKED | SMALL | 127 | 2 | 17.0 | 6.45 | STOCKED | CHTCC CHSNK CHS |
| BAKED | SMALL | 91 | | | | NON-STOCKED | BCHJX CHSNK CHCH |
| BAKED | SMALL | 73 | | | | NON-STOCKED | PLNTR CHSNK CHS |
| BAKED | SMALL | 71 | 2 | 1.1 | 4.67 | STOCKED | CHDDL CHSNK CHS |

[ADD]  [UNDO ALL]

|  | ORIGINAL | REVISED | CHANGE | INDEX |
|---|---|---|---|---|
| SUM WEEKLY STORE $ | 281.23 | 281.23 | 0.00 | 100 |
| ITEM COUNT | 45 | 45 | 0 | |
| ITEMS ADDED | 0 | 0 | 0 | |
| ITEMS DELISTED | 0 | 0 | 0 | |
| AVG SALES PER ITEM $ | 6.25 | 6.25 | 0.00 | 100 |

◉ SEGMENT
○ TOTAL CATEGORY

[APPLY...]  [REPORTS...]  [HELP]

[DONE]

FIG. 20

ASSORTMENT PLANNER – RETAIL CHAIN STORE IN MARKET GEOGRAPHY FOR 12 WKS – 12-28

SCENARIO [ ASSORTMENT RECOMMENDATIONS ▾ ]  [ NEW SCENARIO... ]  [ DELETE SCENARIO... ]

SEGMENT [ CHEESE PUFFS ▾ ]  [ ADVANCED SORT... ]

○ ALL ITEMS  ⦿ ADDED ITEMS  ○ DELISTED ITEMS  ○ STOCKED ITEMS  ○ NON-STOCKED ITEMS

| FLAVOR | SIZE | $/MM INDEX | V-CLASS | % STORES | $/STORE | STATUS | ITEM DESCRIPTION |
|---|---|---|---|---|---|---|---|
| BAKED | SMALL | 180 | 2 | 100.0 | 7.61 | ADDED | HERRS CHSNK CHS BA |
| BAKED | SMALL | 91 | 2 | 100.0 | 3.82 | ADDED | BCHJX CHSNK CHCHS |
| BAKED | SMALL | 73 | 5 | 100.0 | 3.10 | ADDED | PLNTR CHSNK CHS RD |

[ UNDO ]  [ UNDO ALL ]

|  |  | ORIGINAL | REVISED | CHANGE | INDEX |
|---|---|---|---|---|---|
| ⦿ SEGMENT | SUM WEEKLY STORE $ | 281.23 | 281.23 | 0.00 | 100 |
| ○ TOTAL CATEGORY | ITEM COUNT | 45 | 45 | 0 | |
|  | ITEMS ADDED | 0 | 0 | 0 | |
|  | ITEMS DELISTED | 0 | 0 | 0 | |
|  | AVG SALES PER ITEM $ | 6.25 | 6.25 | 0.00 | 100 |

[ APPLY... ]  [ HELP ]

[ DONE ]  [ REPORTS... ]

FIG. 21

ASSORTMENT PLANNER – RETAIL CHAIN STORE IN MARKET GEOGRAPHY FOR 12 WKS – 12-28

SCENARIO [ASSORTMENT RECOMMENDATIONS ▼]   [NEW SCENARIO...]   [DELETE SCENARIO...]

SEGMENT [CHEESE PUFFS ▼]

○ ALL ITEMS   ○ ADDED ITEMS   ⊙ [DELETED ITEMS]   ○ STOCKED ITEMS   ○ NON-STOCKED ITEMS

[ADVANCED SORT...]

| FLAVOR | SIZE | $/MM INDEX | V-CLASS | % STORES | $/STORE | STATUS | ITEM DESCRIPTION |
|---|---|---|---|---|---|---|---|
| FRIED | LARGE | 383 | 7 | 38.3 | 2.06 | DELISTED | JWMCS CHSNK CHS BX |
| BAKED | XXLARGE | 92 | 7 | 1.1 | 2.66 | DELISTED | HERRS CHSNK CHS BA |
| FRIED | SMALL | 63 | 7 | 3.2 | 0.19 | DELISTED | CHETO CHSNK CHS 1.7 |
| BAKED | LARGE | 52 | 7 | 26.6 | 1.33 | DELISTED | BRICR CHSNK TNGCH B |

[UNDO]   [UNDO ALL]

⊙ SEGMENT
○ TOTAL CATEGORY

|  |  | ORIGINAL | REVISED | CHANGE | INDEX |
|---|---|---|---|---|---|
| SUM WEEKLY STORE | $ | 281.23 | 281.23 | 0.00 | 100 |
| ITEM COUNT |  | 45 | 45 | 0 |  |
| ITEMS ADDED |  | 0 | 0 | 0 |  |
| ITEMS DELISTED |  | 0 | 0 | 0 |  |
| AVG SALES PER ITEM | $ | 6.25 | 6.25 | 0.00 | 100 |

[APPLY...]   [HELP]

[DONE]   [REPORTS...]

FIG. 22

RETAIL CHAIN STORE

Category Definition Recap

12 WEEKS ENDING 12-28-97 -- Supermarket Channel -- MARKET GEOGRAPHY

| Segment | Initial Item Count | Active Item Count | Initial Dollar Sales | Active Dollar Sales | Initial % Total Market | Active % Total Market |
|---|---|---|---|---|---|---|
| ALLOTHER | | | | 3,361,448 | | 6.1% |
| ALLOTHSN | 31 | | 670,356 | 2,926,801 | 1.2% | 5.3% |
| CHEEPUFF | 100 | 100 | 2,926,801 | 1,171,305 | 5.3% | 2.1% |
| CORNCHIP | 46 | 46 | 1,171,305 | | 2.1% | |
| EXCLUDED | | | | | | |
| MULGRASN | 10 | | 536,712 | | 1.0% | |
| ONI&GASN | 12 | | 174,746 | | 0.3% | |
| PARTYMIX | 79 | | 1,440,681 | | 2.6% | |
| POPCORN | 169 | 169 | 2,802,727 | 2,802,727 | 5.1% | 5.1% |
| PORKRIND | 37 | | 201,896 | | 0.4% | |
| POTACHIP | 391 | 391 | 18,733,894 | 18,733,894 | 34.2% | 34.2% |
| POTASTIC | 30 | | 337,057 | | 0.6% | |
| PRETZELS | 308 | 308 | 11,105,739 | 11,105,739 | 20.3% | 20.3% |
| TORTCHIP | 207 | 207 | 12,455,611 | 12,455,611 | 22.7% | 22.7% |
| VARIPACK | 10 | 10 | 2,219,608 | 2,219,608 | 4.1% | 4.1% |
| TOTALS | 1,430 | 1,430 | 54,777,133 | 54,777,133 | 100.0% | 100.0% |

Active Item Count column: 199 for ALLOTHSN row.

FIG. 23

RETAIL CHAIN STORE
Salty Snack Market Structure & Demand Coverage By Chain's Assortment*
12 WEEKS ENDING 12-28-97 -- Supermarket Channel -- MARKET GEOGRAPHY

| SEGMENT | IRI MARKET SALES BY MAJOR SEGMENT | | | CHAIN COVERAGE & MARKET SHARE | | | | | |
|---|---|---|---|---|---|---|---|---|---|
| | | | | Market Coverage | | | Retail Sales & Share | | |
| | SKU Count | Retail Sales | % Total Market | SKU Count | % SKU Coverage | % Market Demand | Retail Sales | Market Share | Fair Share Index** |
| PC Potato Chips | 391 | $18,733,894 | 34.2% | 211 | 54.0% | 96.9% | $1,303,997 | 7.0% | 109 |
| TC Tortilla Chips | 207 | $12,455,611 | 22.7% | 104 | 50.2% | 95.4% | $832,516 | 6.7% | 105 |
| PZ Pretzels | 308 | $11,105,739 | 20.3% | 152 | 49.4% | 93.1% | $993,207 | 8.9% | 140 |
| AO All Other | 199 | $3,361,448 | 6.1% | 110 | 55.3% | 90.1% | $208,280 | 6.2% | 97 |
| CP Cheese Puffs | 100 | $2,926,801 | 5.3% | 44 | 44.0% | 93.5% | $222,286 | 7.6% | 119 |
| PP Pop Corn | 169 | $2,802,727 | 5.1% | 79 | 46.7% | 91.0% | $188,576 | 6.7% | 106 |
| VP Variety Pack | 10 | $2,219,608 | 4.1% | 7 | 70.0% | 93.5% | $134,421 | 6.1% | 95 |
| CC Corn Chips | 46 | $1,171,305 | 2.1% | 24 | 52.2% | 97.8% | $66,084 | 5.6% | 89 |
| TOTAL SALTY SNACKS | 1,430 | $54,777,133 | 100.0% | 731 | 51.1% | 94.7% | $3,949,367 | 7.2% | 113 |

ANNUALIZED SUPERMARKET ACV ('000)

MARKET GEOGRAPHY Mark $20,272,188
Chain ACV $1,291,327
Chain Share of ACV 6.4%

\* All store brands excluded from analysis.
\*\* Indexed against chain's share of total market ACV.

FIG. 24

RETAIL CHAIN STORE
Market Coverage Analysis -- Salty Snack Category
12 WEEKS ENDING 12-28-97 - Supermarket Channel - MARKET GEOGRAPHY

| | Segment | Segment Description | Item Description | Stocked | Total Market Retail Sales | Cume % Segment Sales | Market $ Per MM ACV | $/MM Index Vs Seg Avg | Supplier | Brand | Size | Flavor Base | UPC |
|---|---|---|---|---|---|---|---|---|---|---|---|---|---|
| 1 | PC | Potato Chips | LAYS REG PTCHP RP 1 CT BAG 6OZS | Y | 1,561,408 | 8.3% | 77.34 | 1498 | FRITOLAY | LAYSBASE | LARGE | REGFLT | 2840000353 |
| 2 | PC | Potato Chips | RUFFL REG PTCHP RP 1CT BAG 6OZS | Y | 1,212,274 | 14.8% | 60.65 | 1175 | FRITOLAY | RUFBASE | LARGE | REGRDG | 2840000362 |
| 3 | PC | Potato Chips | WISE PTCHP REG BAG 6OZS | Y | 1,075,713 | 20.5% | 53.09 | 1028 | BORDEN | WISE | LARGE | REGFLT | 4126227365 |
| 4 | PC | Potato Chips | PRIGL PTCHP ORGL CNSTR 7OZS | Y | 646,790 | 24.0% | 31.95 | 619 | PROCGAMB | PRINGLES | LARGE | REGFLT | 3700044014 |
| 5 | PC | Potato Chips | WISE PTCHP REGUL RSLBG SS 14OZS | Y | 576,697 | 27.1% | 29.86 | 578 | BORDEN | WISE | XXLARGE | REGFLT | 4126228006 |
| 6 | PC | Potato Chips | BKDLY PTTCR REG BAG 6OZS | Y | 520,953 | 29.9% | 26.44 | 512 | FRITOLAY | LAYSBAKE | LARGE | REGRDG | 2840008489 |
| 7 | PC | Potato Chips | RUFFL PTCR REG BAG SS 14OZS | Y | 482,146 | 32.4% | 27.55 | 534 | FRITOLAY | RUFBASE | XXLARGE | REGRDG | 2840001107 |
| 8 | PC | Potato Chips | WISE PTCHP REG LSL TD BAG 5.5OZS | Y | 424,298 | 34.7% | 20.98 | 406 | BORDEN | WISE | LARGE | REGFLT | 4126227470 |
| 9 | PC | Potato Chips | PRIGL PTCHP SC&O CNSTR 6.75OZS | Y | 389,615 | 36.8% | 19.33 | 374 | PROCGAMB | PRINGLES | LARGE | SOCRMFLT | 3700044511 |
| 10 | PC | Potato Chips | LAYS PTCHP REG BAG SS 14OZS | Y | 380,318 | 38.8% | 21.82 | 423 | FRITOLAY | LAYSBASE | XXLARGE | REGFLT | 2840001010 |
| 11 | PC | Potato Chips | WRIDG PTCHP REG BAG 14OZS | Y | 359,152 | 40.7% | 19.86 | 385 | BORDEN | WISERIDG | XXLARGE | REGRDG | 4126227071 |
| 12 | PC | Potato Chips | LAYS SC&O PTCHP RP 1CT BAG 6OZS | Y | 353,017 | 42.6% | 17.47 | 338 | FRITOLAY | LAYSBASE | LARGE | SOCRMFLT | 2840000360 |
| 13 | PC | Potato Chips | BACHM PTCHP REG BAG 16OZS | Y | 333,906 | 44.4% | 27.50 | 533 | BACHMAN | BACHMAN | XXLARGE | REGRDG | 7781723376 |
| 14 | PC | Potato Chips | PRRGC PTCHP REG 1/3LF CNSTR 6OZS | Y | 329,765 | 46.2% | 16.56 | 321 | PROCGAMB | PRIRIGCR | LARGE | REGFLT | 3700044420 |
| 15 | PC | Potato Chips | RFLCH PTCHP REG 40LFT BAG 13OZS | Y | 308,186 | 47.8% | 19.87 | 385 | FRITOLAY | RUFFRF | XXLARGE | REGRDG | 2840001108 |
| 16 | PC | Potato Chips | RUFFL PTCHP FRONN BAG 6OZS | Y | 290,262 | 49.3% | 14.37 | 278 | FRITOLAY | RUFBASE | LARGE | SOCRMRDG | 2840001478 |
| 17 | PC | Potato Chips | WLAYS REG PTCHP 6OZS | Y | 268,895 | 50.8% | 13.75 | 266 | FRITOLAY | LAYSWAVY | LARGE | REGRDG | 2840000975 |
| 18 | PC | Potato Chips | U T Z PTCHP REG BAG 6OZS | Y | 268,474 | 52.2% | 17.97 | 348 | UTZPOTCH | UTZ | LARGE | REGFLT | 4178000005 |
| 19 | PC | Potato Chips | RUFFL PTCHP BAG 6OZS | Y | 265,833 | 53.6% | 13.28 | 257 | FRITOLAY | RUFBASE | LARGE | SPTOMRDG | 2840001332 |
| 20 | PC | Potato Chips | RUFFL SCHDR PTCHP RP 1CT 6OZS | Y | 259,184 | 55.0% | 13.12 | 254 | FRITOLAY | RUFBASE | LARGE | CHEESRDG | 2840000414 |
| 21 | PC | Potato Chips | WISE PTCHP BAR8Q BAG 5.5OZS | Y | 253,430 | 56.4% | 12.60 | 244 | BORDEN | WISE | LARGE | SPTOMFLT | 4126227369 |
| 22 | PC | Potato Chips | BKDLY PTTCR SC&O BAG 6OZS | Y | 252,222 | 57.7% | 13.45 | 260 | FRITOLAY | LAYSBAKE | LARGE | SOCRMFLT | 2840008497 |
| 23 | PC | Potato Chips | BKDLY PTCHP REG 94FF BAG 10OZS | Y | 251,374 | 59.1% | 17.52 | 339 | FRITOLAY | LAYSBAKE | XXLARGE | REGFLT | 2840006753 |
| 24 | PC | Potato Chips | WISE PTCHP O&G BAG 5.5OZS | Y | 249,543 | 60.4% | 12.47 | 241 | BORDEN | WISE | LARGE | AOFLVFLT | 4126227042 |
| 25 | PC | Potato Chips | RFTHW PTCHP CDBSC BAG 6OZS | Y | 247,882 | 61.7% | 12.72 | 246 | FRITOLAY | RUFBASE | LARGE | AOFLVRDG | 2840006907 |
| 26 | PC | Potato Chips | LAYS PTCHP KCMSB BAG 6OZS | Y | 232,454 | 63.0% | 11.83 | 229 | FRITOLAY | LAYSBAKE | LARGE | SPTOMFLT | 2840000987 |
| 27 | PC | Potato Chips | BKDLY PTTCR KCMSB BAG 6OZS | Y | 227,079 | 64.2% | 11.46 | 222 | FRITOLAY | LAYSBAKE | LARGE | SPTOMFLT | 2840008493 |
| 28 | PC | Potato Chips | HERRS PTCHP REG BAG 20OZS | Y | 210,598 | 65.3% | 16.26 | 315 | HERR | HERRS | 3XL | REGRDG | 7260000930 |
| 29 | PC | Potato Chips | HERRS PTCHP REG BAG 20OZS | Y | 204,704 | 66.4% | 15.95 | 309 | HERR | HERRS | 3XL | REGFLT | 7260000920 |
| 30 | PC | Potato Chips | HERRS PTCHP REG BAG 6OZS | Y | 199,192 | 67.4% | 13.60 | 263 | HERR | HERRS | LARGE | REGFLT | 7260000659 |
| 31 | PC | Potato Chips | PRRGC PTCHP SC&O 1/3LF 6OZS | Y | 191,705 | 68.5% | 11.54 | 223 | PROCGAMB | PRIRIGCR | LARGE | SOCRMFLT | 3700044001 |
| 32 | PC | Potato Chips | WRIDG PTCHP SC&O BAG 5.5OZS | Y | 181,402 | 69.4% | 8.99 | 174 | BORDEN | WISERIDG | LARGE | SOCRMRDG | 4126228630 |
| 33 | PC | Potato Chips | LAYS S&V PTCHP RP 1CT BAG 6OZS | Y | 175,731 | 70.4% | 9.43 | 183 | FRITOLAY | LAYSBASE | LARGE | AOFLVFLT | 2840000545 |
| 34 | PC | Potato Chips | WISE PTCHP REG SLTD BAG 6OZS | Y | 171,280 | 71.3% | 9.16 | 177 | BORDEN | WISE | LARGE | REGRDG | 4126228620 |
| 35 | PC | Potato Chips | NAPAC PTSNK ORGL BX 7.5OZS | Y | 160,739 | 72.1% | 8.39 | 162 | RJRNABIS | NAPOAICR | LARGE | REGFLT | 4400000050 |
| 36 | PC | Potato Chips | WISE PTCHP S&V BAG 5.5OZS | Y | 157,038 | 73.0% | 8.20 | 159 | BORDEN | WISE | LARGE | AOFLVFLT | 4126227415 |
| 37 | PC | Potato Chips | HERRS PTCHP SC&O BAG 6OZS | Y | 154,979 | 73.8% | 10.64 | 206 | HERR | HERRS | LARGE | SOCRMRDG | 7260000085 |
| 38 | PC | Potato Chips | LAYS PTCHP HTINB BAG 6OZS | Y | 148,764 | 74.6% | 7.54 | 146 | FRITOLAY | LAYSBASE | LARGE | SPTOMFLT | 2840000359 |

FIG. 26

Table 4a
Salty Snack Category
Velocity Class Breakout By Manufacturer
Core Manufacturers

| Rank | Vendor | Total Sys. Wkly $ Vol. | SALES PER-STORE-HANDLING | | | Total SKUs | % OF MFGR. SKUs BY VELOCITY CLASS | | | | | | |
|---|---|---|---|---|---|---|---|---|---|---|---|---|---|
| | | | Avg SKU $ Sales | Avg SKU Unit Sales | Avg Price Per Unit | | #1 | #2 | #3 | #4 | #5 | #6 | #7 |
| 1 | FRITOLAY | 134,838 | 12.07 | 9.8 | 1.52 | 158 | 5% | 12% | 18% | 22% | 25% | 10% | 9% |
| 2 | BORDEN | 62,065 | 10.62 | 8.3 | 1.34 | 77 | 4% | 8% | 22% | 21% | 26% | 5% | 14% |
| 3 | BACHMAN | 41,842 | 9.51 | 6.4 | 1.66 | 58 | 3% | 3% | 16% | 22% | 21% | 21% | 14% |
| 4 | SYNDHANO | 33,001 | 9.60 | 5.4 | 1.75 | 47 | | 9% | 11% | 17% | 38% | 19% | 6% |
| 5 | PRIVLABE | 13,066 | 8.35 | 8.8 | 0.93 | 19 | | 16% | 21% | 32% | 11% | 11% | 11% |
| 6 | PROCGAMB | 12,717 | 9.45 | 6.8 | 1.51 | 16 | | 13% | 19% | 19% | | 31% | 19% |
| CORE SUBTOTAL | | 297,528 | | | | 375 | 3% | 10% | 18% | 21% | 24% | 13% | 11% |
| CORE % TOTAL SS | | 87% | | | | 50% | | | | | | | |

FIG. 28

Table 1
Salty Snack Sales Velocity Analysis

| | | Velocity Class | | | | | | | Combined Classes 5-7 |
|---|---|---|---|---|---|---|---|---|---|
| | Combined Total | #1 | #2 | #3 | #4 | #5 | #6 | #7 | |
| Weekly Unit Sales Per Store Handlin | | 32+ | 16-32 | 8-16 | 4-8 | 2-4 | 1-2 | Under 1 | |
| SKU COUNT | 750 | 13 | 38 | 74 | 108 | 152 | 124 | 241 | 517 |
| % Total SKUs | 100.0% | 1.7% | 5.1% | 9.9% | 14.4% | 20.3% | 16.5% | 32.1% | 68.9% |
| AVERAGE WEEKLY SALES | | | | | | | | | |
| Total Chain Unit Vol. | 230,377 | 52,050 | 59,279 | 55,185 | 38,720 | 18,050 | 5,052 | 2,042 | 25,144 |
| Total Chain Dollar Vol. | $342,180 | $66,687 | $72,357 | $88,373 | $67,147 | $33,981 | $9,738 | $3,898 | $47,616 |
| SALES SKEW ANALYSIS | | | | | | | | | |
| GROSS STORE BASIS | | | | | | | | | |
| % Total SKUs | 100.0% | 1.7% | 5.1% | 9.9% | 14.4% | 20.3% | 16.5% | 32.1% | 68.9% |
| % Retail $ Sales | 100.0% | 19.5% | 21.1% | 25.8% | 19.6% | 9.9% | 2.8% | 1.1% | 13.9% |
| Cume % Total SKUs | | 2% | 7% | 17% | 31% | 51% | 68% | 100% | 69% |
| Cume % Retail $ Sales | | 19% | 41% | 66% | 86% | 96% | 99% | 100% | 14% |

2% Of Active SKUs Generate 19% Of Total Dollar Sales

69% Of Active SKUs Generate 14% of Total Dollar Sales

FIG. 29

Table 2
Salty Snack Stores Handling Analysis

| | Combined Total | Velocity Class | | | | | | | Combined Classes 5-7 |
|---|---|---|---|---|---|---|---|---|---|
| | | #1 | #2 | #3 | #4 | #5 | #6 | #7 | |
| Weekly Unit Sales Per Store Handling | | 32+ | 16-32 | 8-16 | 4-8 | 2-4 | 1-2 | Under 1 | |
| PERFORMANCE PER STORE HANDLING | | | | | | | | | |
| Avg. No. Stores Handling | 37 | 69 | 69 | 66 | 61 | 41 | 27 | 15 | 25.4 |
| Avg. % Stores Handling | 40% | 73% | 73% | 70% | 65% | 43% | 29% | 16% | 27% |
| Avg. Weekly Units/Store | 8.2 | 58.0 | 22.7 | 11.3 | 5.9 | 2.9 | 1.5 | 0.6 | 1.9 |
| Avg. Price Per Unit | $1.49 | $1.28 | $1.22 | $1.60 | $1.73 | $1.88 | $1.93 | $1.91 | $1.89 |
| Avg. Weekly Sales/Store | $12.19 | $74.27 | $27.65 | $18.09 | $10.25 | $5.51 | $2.86 | $1.10 | $3.63 |

HOW TO INTERPRET

The average Class #1 SKU is carried by 69 stores. It sells an average of 58.0 units per week, per store, at an average $1.28 per unit. The average Class #1 SKU generates $74.27 in weekly sales per store handling, compared to $3.63 per week, per store, for the average SKU in Classes #5-#7.

Table 3
Salty Snack Category
Velocity Class Breakout By Subcategory

| Subcategory | Total Sys. Wkly $ Vol. | SALES PER-STORE-HANDLING | | | Total SKUs | % OF TOTAL SKUs BY VELOCITY CLASS | | | | | | |
|---|---|---|---|---|---|---|---|---|---|---|---|---|
| | | Avg SKU $ Sales | Avg SKU Unit Sales | Avg Price Per Unit | | #1 | #2 | #3 | #4 | #5 | #6 | #7 |
| Potato Chips | 115,963 | 7.57 | 6.7 | 1.21 | 217 | 2% | 9% | 11% | 13% | 24% | 12% | 28% |
| Pretzels | 86,608 | 7.42 | 4.7 | 1.56 | 157 | 1% | 3% | 14% | 15% | 17% | 21% | 29% |
| Tortilla Chips | 70,056 | 9.29 | 5.4 | 2.00 | 109 | 4% | 5% | 12% | 12% | 17% | 14% | 37% |
| Cheese Puffs | 19,124 | 6.25 | 6.2 | 1.24 | 45 | 2% | 9% | 4% | 27% | 16% | 22% | 20% |
| All Other | 17,357 | 3.88 | 2.7 | 1.61 | 110 | | 2% | 6% | 12% | 19% | 20% | 41% |
| Pop Corn | 16,217 | 3.73 | 2.7 | 1.56 | 80 | | 1% | 5% | 15% | 23% | 19% | 38% |
| Variety Pack | 11,202 | 20.11 | 5.9 | 3.16 | 7 | | | 14% | 43% | 29% | | 14% |
| Corn Chips | 5,654 | 4.35 | 4.6 | 1.40 | 25 | 4% | 4% | 4% | 8% | 28% | 8% | 44% |
| GRAND TOTAL | 342,180 | | | | 750 | 2% | 5% | 10% | 14% | 20% | 17% | 32% |

Table 4b
Salty Snack Category
Velocity Class Breakout By Manufacturer
Complete Report Manufacturers

| Rank | Vendor | Total Sys. Wkly $ Vol. | SALES PER-STORE-HANDLING ||| Total SKUs | % OF MFGR. SKUs BY VELOCITY CLASS |||||||
|---|---|---|---|---|---|---|---|---|---|---|---|---|---|
| | | | Avg SKU $ Sales | Avg SKU Unit Sales | Avg Price Per Unit | | #1 | #2 | #3 | #4 | #5 | #6 | #7 |
| 1 | FRITOLAY | 134,838 | 12.07 | 9.8 | 1.52 | 158 | 5% | 12% | 18% | 22% | 25% | 10% | 9% |
| 2 | BORDEN | 62,065 | 10.62 | 8.3 | 1.34 | 77 | 4% | 8% | 22% | 21% | 26% | 5% | 14% |
| 3 | BACHMAN | 41,842 | 9.51 | 6.4 | 1.66 | 58 | 3% | 3% | 16% | 22% | 21% | 21% | 14% |
| 4 | SYNDHANO | 33,001 | 9.60 | 5.4 | 1.75 | 47 | | 9% | 11% | 17% | 38% | 19% | 6% |
| 5 | PRIVLABE | 13,066 | 8.35 | 8.8 | 0.93 | 19 | | 16% | 21% | 32% | 11% | 11% | 11% |
| 6 | PROCGAMB | 12,717 | 9.45 | 6.8 | 1.51 | 16 | | 13% | 19% | 19% | | 31% | 19% |
| | SUBTOTAL | 297,528 | | | | 375 | 3% | 10% | 18% | 21% | 24% | 13% | 11% |
| | % TOTAL SS | 87% | | | | 50% | | | | | | | |
| 7 | UTZPOTCH | 12,550 | 3.52 | 2.6 | 1.19 | 59 | 2% | | 3% | 8% | 34% | 22% | 31% |
| 8 | BOSTPOPC | 4,527 | 5.69 | 2.9 | 2.07 | 13 | | | 8% | 23% | 8% | 38% | 23% |
| 9 | RJRNABIS | 3,551 | 8.00 | 4.1 | 2.04 | 6 | | | | 50% | 33% | 17% | |
| 10 | CAMPSOUP | 3,010 | 4.79 | 2.2 | 1.83 | 11 | | | | 9% | 18% | 73% | |
| 11 | ANHEUSER | 1,966 | 4.64 | 3.5 | 1.77 | 9 | | | 11% | 11% | 56% | 22% | |
| 12 | AMERHOME | 1,712 | 3.88 | 2.7 | 1.43 | 5 | | | | | 100% | | |
| 13 | GF | 1,405 | 7.71 | 3.4 | 2.30 | 2 | | | | 50% | | 50% | |
| 14 | RALSPURI | 1,399 | 5.98 | 2.3 | 2.20 | 8 | | | 13% | | 13% | 25% | 50% |
| 15 | MMMARS | 1,354 | 7.24 | 3.9 | 1.85 | 2 | | | | 50% | 50% | | |

Sales Skew Analysis

Sales Velocity Class Definition

Average SKU Distribution Levels By Velocity Class

Absolute Item Count By Velocity Class

FIG. 38

Salty Snack Category SKU Velocity Class Report

| Sub Cat. | Size | Vendor | Description | UPC | STORES HANDLING | | Velocity Class | WEEKLY SALES | | | | | |
|---|---|---|---|---|---|---|---|---|---|---|---|---|---|
| | | | | | | | | Per Store Handling | | | Total Store Sales | | |
| | | | | | % | Number | | Dollars | Units | | Dollars | Units | |
| PC | SMALL | FRITOLAY | RFTHW PTCHP CDBSC BAG 10ZS | 2840006962 | 6.4 | 6 | 1 | 9.29 | 42.2 | | 56 | 254 | |
| PC | SMALL | FRITOLAY | LAYS REG PTCHP RP 1CT BAG 10ZS | 2840009085 | 43.6 | 41 | 2 | 7.46 | 31.2 | | 306 | 1,281 | |
| PC | SMALL | FRITOLAY | LAYS SC&O PTCHP RP 1CT BAG 10ZS | 2840009088 | 6.4 | 6 | 2 | 5.15 | 22.7 | | 31 | 137 | |
| PC | SMALL | FRITOLAY | LAYS KCMBBQ 10ZS | 2840000861 | 3.8 | 4 | 2 | 4.76 | 21.7 | | 17 | 77 | |
| PC | SMALL | FRITOLAY | MNCHO REG PTCHP RP 1CT .8750ZS | 2840009083 | 38.3 | 36 | 3 | 5.16 | 21.5 | | 186 | 773 | |
| PC | SMALL | FRITOLAY | LAYS S&V PTCHP RP 1CT BAG 10ZS | 2840009009 | 5.3 | 5 | 3 | 3.43 | 15.6 | | 17 | 78 | |
| PC | SMALL | FRITOLAY | LAYS PTCHP HTTNB BAG 1.750ZS | 2840009157 | 1.1 | 1 | 3 | 6.37 | 12.8 | | 7 | 13 | |
| PC | SMALL | FRITOLAY | RUFFL REG PTCHP RP 1CT BAG 10ZS | 2840009014 | 37.2 | 35 | 3 | 3.01 | 12.1 | | 105 | 422 | |
| PC | SMALL | ANHEUSER | CPCOD PTCHP REG BAG 10ZS | 2068508471 | 6.4 | 6 | 3 | 3.55 | 10.6 | | 21 | 64 | |
| PC | SMALL | BORDEN | WISE PTCHP BBQ BAG 10ZS | 4126227089 | 1.1 | 1 | 3 | 2.66 | 10.6 | | 3 | 11 | |
| PC | SMALL | BORDEN | WISE PTCHP REG BAG 1.1250ZS | 4126227271 | 1.1 | 1 | 3 | 2.58 | 10.2 | | 3 | 11 | |
| PC | SMALL | PROCGAMB | PRIGL PTTCR SC&O CNSTR 20ZS | 3700044526 | 5.3 | 5 | 4 | 4.62 | 7.8 | | 23 | 39 | |
| PC | SMALL | BACHMAN | BACHM PTCHP BBQ BAG 10ZS | 7781723498 | 1.3 | 1 | 4 | 1.70 | 7.8 | | 2 | 10 | |
| PC | SMALL | PROCGAMB | PRIGL PTTCR REG CNSTR 20ZS | 3700044533 | 6.4 | 6 | 4 | 3.98 | 6.7 | | 24 | 41 | |
| PC | SMALL | BORDEN | WRIDG PTCHP SC&O BAG 10ZS | 4126227086 | 2.2 | 2 | 4 | 1.33 | 5.3 | | 3 | 11 | |
| PC | SMALL | BACHMAN | BACHM PTCHP HPCNT BAG 10ZS | 7781723534 | 1.3 | 1 | 5 | 1.16 | 5.1 | | 1 | 6 | |
| PC | SMALL | FRITOLAY | LAYS PTCHP REG BAG 1.750ZS | 2840000490 | 2.1 | 2 | 5 | 3.00 | 4.5 | | 4 | 6 | |
| PC | SMALL | BACHMAN | BACHM PTCHP SC&O BAG 10ZS | 7781723583 | 8.7 | 8 | 5 | 0.76 | 3.5 | | 2 | 7 | |
| PC | SMALL | FRITOLAY | BKDLY PTTCR REG L/FT 1.1250ZS | 2840005879 | 16.0 | 15 | 5 | 1.52 | 3.0 | | 12 | 25 | |
| PC | SMALL | FRITOLAY | RUFFL REG RDPTC 1.750ZS | 2840009266 | 1.3 | 1 | 5 | 1.46 | 2.9 | | 22 | 44 | |
| PC | SMALL | FRITOLAY | RUFFL PTCHP REG BAG 1.750ZS | 2840000491 | 1.3 | 1 | 5 | 1.77 | 2.7 | | 2 | 3 | |
| PC | SMALL | FRITOLAY | MNCHO PTCHP REG BAG 1.6250ZS | 2840001382 | 5.4 | 5 | 5 | 1.70 | 2.6 | | 7 | 13 | |
| PC | SMALL | FRITOLAY | RFTHW PTCHP CDBSC BAG 1.750ZS | 2840006966 | 1.1 | 1 | 5 | 1.33 | 2.6 | | 1 | 5 | |
| PC | SMALL | FRITOLAY | BKDLY PTTCR SC&O BAG 1.1250ZS | 2840008281 | 2.1 | 2 | 5 | 1.29 | 2.6 | | 1 | 3 | |
| PC | SMALL | BACHMAN | BACHM PTCHP REG BAG 10ZS | 2840002214 | 21.3 | 20 | 5 | 0.55 | 2.3 | | 23 | 46 | |
| PC | SMALL | FRITOLAY | LAYS REG PTCHP 1.750ZS | 2840009257 | 5.3 | 5 | 5 | 1.14 | 2.3 | | 6 | 12 | |
| PC | SMALL | FRITOLAY | MNCHO PTTCR REG BAG 1.3750ZS | 7781723040 | 1.1 | 1 | 5 | 1.15 | 2.3 | | 1 | 2 | |
| PC | SMALL | BORDEN | WISE PTCHP O&G BAG 10ZS | 4126227088 | 6.4 | 6 | 6 | 0.56 | 2.0 | | 6 | 12 | |
| PC | SMALL | FRITOLAY | LAYS SC&O PTCHP 1.50ZS | 2840009267 | 5.3 | 5 | 6 | 1.03 | 1.9 | | 5 | 9 | |
| PC | SMALL | PROCGAMB | PRIGL PTTCR CHS CNSTR 20ZS | 3700044509 | 1.1 | 1 | 6 | 1.09 | 1.8 | | 2 | 2 | |
| PC | SMALL | FRITOLAY | LAYS KCMBQ PTCHP 1.750ZS | 2840000882 | 4.3 | 4 | 6 | 0.89 | 1.5 | | 3 | 6 | |
| PC | SMALL | FRITOLAY | BKDLY PTTCR KCMSB RDGFT 1.1250ZS | 2840005882 | 4.3 | 4 | 6 | 0.76 | 1.5 | | 3 | 6 | |

FIG. 39

Assortment Planner Scenario: ASSORTMENT RECOMMENDATIONS*

| Total Category | | Original | Revised | Change | Index |
|---|---|---|---|---|---|
| Sum Weekly Store | $ | 4,648.94 | 4,691.28 | +42.34 | 101 |
| Item Count | | 640 | 637 | -3 | |
| Items Added | | 0 | 8 | +8 | |
| Items Delisted | | 0 | 11 | -11 | |
| Avg Sales Per Item | $ | 7.26 | 7.36 | +0.10 | 101 |

| Cheese Puffs | | Original | Revised | Change | Index |
|---|---|---|---|---|---|
| Sum Weekly Store | $ | 281.23 | 323.56 | +42.34 | 115 |
| Item Count | | 45 | 42 | -3 | |
| Items Added | | 0 | 8 | +8 | |
| Items Delisted | | 0 | 11 | -11 | |
| Avg Sales Per Item | $ | 6.25 | 7.70 | +1.45 | 123 |

| Corn Chips | | Original | Revised | Change | Index |
|---|---|---|---|---|---|
| Sum Weekly Store | $ | 108.85 | 108.85 | 0.00 | 100 |
| Item Count | | 25 | 25 | 0 | |
| Items Added | | 0 | 0 | 0 | |
| Items Delisted | | 0 | 0 | 0 | |
| Avg Sales Per Item | $ | 4.35 | 4.35 | 0.00 | 100 |

| Pop Corn | | Original | Revised | Change | Index |
|---|---|---|---|---|---|
| Sum Weekly Store | $ | 298.15 | 298.15 | 0.00 | 100 |
| Item Count | | 80 | 80 | 0 | |
| Items Added | | 0 | 0 | 0 | |
| Items Delisted | | 0 | 0 | 0 | |
| Avg Sales Per Item | $ | 3.73 | 3.73 | 0.00 | 100 |

* Totals include all store brands

FIG. 40

RETAIL CHAIN STORE

12 WEEKS ENDING 12-28-97 -- Supermarket Channel -- MARKET GEOGRAPHY

Salty Snack Market Structure & Demand Coverage By Chain's Assortment*

Assortment Planner Scenario: ASSORTMENT RECOMMENDATIONS -- Projected Results

| SEGMENT | IRI MARKET SALES BY MAJOR SEGMENT | | | PROJECTED CHAIN COVERAGE & MARKET SHARE | | | | | |
|---|---|---|---|---|---|---|---|---|---|
| | | | | Market Coverage | | | Retail Sales & Share | | |
| | SKU Count | Retail Sales | % Total Market | SKU Count | % SKU Coverage | % Market Demand | Retail Sales | Market Share | Fair Share Index** |
| PC Potato Chips | 391 | $18,733,894 | 34.2% | 211 | 54.0% | 96.9% | $1,303,997 | 7.0% | 7 |
| TC Tortilla Chips | 207 | $12,455,611 | 22.7% | 104 | 50.2% | 95.4% | $832,516 | 6.7% | 7 |
| PZ Pretzels | 308 | $11,105,739 | 20.3% | 152 | 49.4% | 93.1% | $993,207 | 8.9% | 9 |
| | 199 | $3,361,448 | 6.1% | | | | | | |
| CP Cheese Puffs | 100 | $2,926,801 | 5.3% | 41 | 41.0% | 92.7% | $291,576 | 10.0% | 10 |
| PP Pop Corn | 169 | $2,802,727 | 5.1% | 79 | 46.7% | 91.0% | $188,576 | 6.7% | 7 |
| VP Variety Pack | 10 | $2,219,608 | 4.1% | 7 | 70.0% | 93.5% | $134,421 | 6.1% | 6 |
| CC Corn Chips | 46 | $1,171,305 | 2.1% | 24 | 52.2% | 97.8% | $66,084 | 5.6% | 6 |
| TOTAL SALTY SNACKS | 1,430 | $54,777,133 | 100.0% | 618 | 43.2% | 89.2% | $3,810,377 | 7.0% | 109 |

ANNUALIZED SUPERMARKET ACV ('000)

MARKET GEOGRAPHY Mark    $20,272,188
Chain ACV                $1,291,327
Chain Share of ACV       6.4%

* All store brands excluded from analysis.
** Indexed against chain's share of total market ACV.

FIG. 41

Assortment Planner Scenario: ASSORTMENT
RECOMMENDATIONS -- Projected Weekly Sales

| Sub Cat. | Size | Vendor | Description | UPC | STORES HANDLING | | Projected Velocity Class | PROJECTED WEEKLY SALES | | | |
|---|---|---|---|---|---|---|---|---|---|---|---|
| | | | | | % | Number | | Per Store Handling | | Total Store Sales | |
| | | | | | | | | Dollars | Units | Dollars | Units |
| PC | SMALL | FRITOLAY | RFTHW PTCHP CDBSC BAG 1OZS | 2840006962 | 6.4 | 6 | 1 | 9.29 | 39.5 | 56 | 238 |
| PC | SMALL | FRITOLAY | LAYS REG PTCHP RP 1CT BAG 1OZS | 2840009085 | 43.6 | 41 | 2 | 7.46 | 30.5 | 306 | 1,249 |
| PC | SMALL | FRITOLAY | MNCHO REG PTCHP RP 1CT .875OZS | 2840009083 | 38.3 | 36 | 2 | 5.16 | 21.2 | 186 | 763 |
| PC | SMALL | FRITOLAY | LAYS SC&O PTCHP RP 1CT BAG 1OZS | 2840009088 | 6.4 | 6 | 2 | 5.15 | 20.8 | 31 | 125 |
| PC | SMALL | FRITOLAY | LAYS KCMBBQ 1OZS | 2840000861 | 3.8 | 4 | 3 | 4.76 | 20.1 | 17 | 72 |
| PC | SMALL | FRITOLAY | LAYS S&V PTCHP RP 1CT BAG 1OZS | 2840009009 | 5.3 | 5 | 3 | 3.43 | 14.8 | 17 | 73 |
| PC | SMALL | FRITOLAY | LAYS PTCHP HTTNB BAG 1.75OZS | 2840009157 | 1.1 | 1 | 3 | 6.37 | 12.7 | 7 | 13 |
| PC | SMALL | FRITOLAY | RUFFL REG PTCHP RP 1CT BAG 1OZS | 2840009014 | 37.2 | 35 | 3 | 3.01 | 12.3 | 105 | 432 |
| PC | SMALL | BORDEN | WISE PTCHP BBQ BAG 1OZS | 4126227089 | 1.1 | 1 | 3 | 2.66 | 10.7 | 3 | 11 |
| PC | SMALL | ANHEUSER | CPCOD PTCHP REG BAG 1OZS | 2068508471 | 6.4 | 6 | 3 | 3.55 | 10.6 | 21 | 64 |
| PC | SMALL | BORDEN | WISE PTCHP REG BAG 1.125OZS | 4126227271 | 1.1 | 1 | 3 | 2.58 | 10.3 | 3 | 11 |
| PC | SMALL | PROCGAMB | PRIGL PTTCR SC&O CNSTR 2OZS | 3700044526 | 5.3 | 5 | 4 | 4.62 | 8.0 | 23 | 40 |
| PC | SMALL | BACHMAN | PRIGL PTTCR BBQ BAG 1OZS | 7781723498 | 1.1 | 1 | 4 | 1.70 | 8.0 | 2 | 10 |
| PC | SMALL | PROCGAMB | PRIGL PTTCR REG CNSTR 2OZS | 3700044533 | 6.4 | 6 | 4 | 3.98 | 6.8 | 24 | 41 |
| PC | SMALL | BACHMAN | BACHM PTCHP HPCNT BAG 1OZS | 7781723534 | 1.3 | 1 | 4 | 1.16 | 5.4 | 1 | 7 |
| PC | SMALL | BORDEN | WRIDG PTCHP SC&O BAG 1OZS | 4126227086 | 2.2 | 2 | 4 | 1.33 | 5.3 | 3 | 11 |
| PC | SMALL | FRITOLAY | LAYS PTCHP REG BAG 1.75OZS | 2840000490 | 1.3 | 1 | 5 | 3.00 | 4.0 | 4 | 5 |
| PC | SMALL | BACHMAN | BACHM PTCHP SC&O BAG 1OZS | 7781723583 | 2.1 | 2 | 5 | 0.76 | 3.6 | 2 | 7 |
| PC | SMALL | FRITOLAY | BKDLY PTTCR REG L/FT 1.125OZS | 2840005879 | 8.7 | 8 | 5 | 1.52 | 3.0 | 12 | 25 |
| PC | SMALL | FRITOLAY | RUFFL REG RDPTC 1.75OZS | 2840009266 | 16.0 | 15 | 5 | 1.46 | 2.9 | 22 | 44 |
| PC | SMALL | FRITOLAY | RFTHW PICHP CDBSC BAG 1.75OZS | 2840006966 | 5.4 | 5 | 5 | 1.33 | 2.7 | 7 | 13 |
| PC | SMALL | BACHMAN | BKDLY PTTCR SC&O BAG 1.125OZS | 2840008281 | 1.1 | 1 | 5 | 1.29 | 2.6 | 1 | 3 |
| PC | SMALL | BACHMAN | BACHM PTCHP REG BAG 1OZS | 7781723040 | 1.1 | 1 | 5 | 0.55 | 2.6 | 1 | 3 |
| PC | SMALL | FRITOLAY | RUFFL PTCHP REG BAG 1.625OZS | 2840000491 | 2.1 | 2 | 5 | 1.77 | 2.4 | 2 | 5 |
| PC | SMALL | FRITOLAY | MNCHO PTCHP REG BAG 1.75OZS | 2840001382 | 1.3 | 1 | 5 | 1.70 | 2.3 | 2 | 3 |
| PC | SMALL | FRITOLAY | LAYS REG PTCHP BAG 1.375OZS | 2840002214 | 21.3 | 20 | 5 | 1.14 | 2.3 | 23 | 46 |
| PC | SMALL | FRITOLAY | MNCHO PTCHP REG BAG 1.75OZS | 2840009257 | 5.3 | 5 | 5 | 1.15 | 2.3 | 6 | 12 |
| PC | SMALL | FRITOLAY | LAYS SC&O PTCHP 1.5OZS | 2840009257 | 6.4 | 6 | 6 | 1.03 | 2.1 | 6 | 12 |
| PC | SMALL | BORDEN | WISE PTCHP O&G BAG 1OZS | 4126227088 | 1.1 | 1 | 6 | 0.56 | 2.1 | 1 | 2 |
| PC | SMALL | PROCGAMB | PRIGL PTTCR CHS CNSTR 2OZS | 3700044509 | 5.3 | 5 | 6 | 1.09 | 1.9 | 5 | 9 |
| PC | SMALL | FRITOLAY | LAYS KCMBQ PTCHP 1.75OZS | 2840000882 | 1.1 | 1 | 6 | 0.89 | 1.8 | 1 | 2 |
| PC | SMALL | FRITOLAY | BKDLY PTTCR KCMSB RDCFT 1.125OZS | 2840005882 | 4.3 | 4 | 6 | 0.76 | 1.5 | 3 | 6 |

PRODUCT INVENTORY CATEGORY MANAGEMENT AND VARIETY OPTIMIZATION METHOD AND SYSTEM

BACKGROUND OF THE INVENTION

Technical Field of the Invention

In the field of retail product sales, a method and system for categorizing products and optimizing the variety of products carried at a retail store based upon an analysis of retail sales data for a geographic region and a chain of stores.

DESCRIPTION OF RELATED ART INCLUDING INFORMATION DISCLOSED UNDER 37 CFR 1.97 AND 1.98

Retail sales of packaged food items is a very competitive business offering a wide variety of products. For example, a single food manufacturer may produce food items based upon different food types (e.g. potato chip, corn chip, cheese puff), flavoring (e.g.. salted, Bar-B-Que, ranch dressing, Mexican spicy seasoning, etc.), package sizes (e.g.. 32 oz., 24 oz., 12 oz), and package types (e.g., bag, tin, tub, canister). A retail store must select its assortment from the wide variety of products available in the market. Preferably, the retail store would like to select the most popular goods for its assortment.

Many forces contribute to the popularity of a particular packaged food item such as marketing campaigns, the seasons of the year, and the consumer appeal in a specific geographic area. For instance, a marketing campaign directed toward publicizing a certain packaged food item could increase the demand for that food item significantly over competing goods and the prior sales performance for that food item. Further, the summer months may make one packaged food item more appealing, while colder weather may have a reverse impact on the sales of that same product. People living in different geographic areas may find certain packaged food items more appealing than others. For instance, people in the southern United States may find corn-based snack food items more appealing than the northern United States, while those people in the midwest United States may find potato-based packaged snack food items more appetizing.

The packaged food items with greater popularity will inevitably sell much faster than packaged food items of less popularity. Greater sales usually translates into greater profits. Of all products in the market, the most popular products only comprise a small percentage of the total number of items available. In fact, it has been estimated that twenty percent (20%) of the most popular food items comprise approximately eighty percent (80%) of all sales in that category of food products. Moreover, fifty to sixty percent (50%–60%) of the least popular packaged food items comprise approximately ten percent (10%) of total sales in that category of food product. Accordingly, there is a great disparity between the total sales percentages for the most popular twenty percent (20%) of the packaged food products and the least popular fifty to sixty percent (50%–60%)of the packaged food products.

A representative sales curve can be seen in FIG. 32 which shows the cumulative percent of total supermarket chain sales volume for a geographic area for the cumulative percent of total items available in that supermarket chain. In FIG. 32, the top twenty percent (20%) of products available in the supermarket comprise approximately seventy-five percent (75%) of the total supermarket sales volume. Further, the lower sixty percent (60%) of available products comprise approximately ten percent (10%) of the total sales volume. Because the top twenty percent (20%) of products will generate more profits than the lower (60%) of products, a retailer wants to focus upon a product assortment which emphasizes the top twenty percent (20%) of popular products while de-emphasizing (or eliminating) the lower sixty percent (60%) of the less popular products. In order to optimize a product selection, there is a need to identify the more popular top percentage of products and the lower less popular percentage of products.

Optimizing the profitability of your product assortment is even more important considering the limited shelf space available at grocery stores and supermarkets for each type of food product. As discussed in U. S. Pat. No. 4,112,598 to Maass and U.S. Pat. No. 4,947,322 to Temma, the layout of shelf space at retail stores can be modeled to optimize the shelf space as a limited resource. For the same amount of shelf space, the top percentage of popular food products will return greater profits than the least popular food products. Accordingly, grocery stores and supermarkets have a desire to maximize their profits from their finite amount of shelf space by allocating the most amount of space for the most popular food products and the least amount of space (or no space) for the least popular food products.

Computerized inventory systems are discussed in U. S. Patent No. 4,737,910 to Kimbrow, U.S. Pat. No. 4,797,819 to Dechirot, U.S. Pat. No. 4,972,318 to Brown, U.S. Pat. No. 4,783,740 to Ishizawa, U.S. Pat. No. 4,654,800 to Hayashi and U.S. Pat. No. 4,639,875 to Abraham. While these inventory systems track inventory levels and determine replenishment requirements for a product based upon sales data, these systems do not assist with the determination of the popular variety of goods or the optimization of product selection to maximize profits.

U.S. Pat. No. 5,237,496 to Kagimi, U.S. Pat. No. 5,128,861 to Kagimi, and U.S. Pat. No. 5,313,392 to Temma attempt to forecast future replenishment needs based upon planned sales and/or actual sales of products in inventory. While the products in inventory can be analyzed vis-a-vis their predicted sales or the sales of other goods in inventory, these patents only focus on the products already in inventory. Other popular products may exist in the market which are not carried in inventory, and if added to the store's assortment, would increase the profitability for that store. By looking beyond an actual store's current inventory to other stores in a chain or all stores in a geographic area, a greater number of the popular products and the less popular products can be identified for the geographic area or a chain of stores. A significant need exists with determining the popular products for all stores in a geographic region or for a chain of stores.

Retail sales data is available for most stores in a geographic region and for specific chains of stores in a geographic region, but the volume of this data makes it difficult to analyze in a quick and comprehensible manner. As such, a further problem exists with the ability to flexibly categorize products based on retail sales data and manipulate this large amount of retail sales data in a rapid manner to produce easy to understand tables and graphs which demonstrate the popularity of a variety of a food item and the optimal assortment of food items for a store. Accordingly, there is a significant need to analyze large amounts of retail sales data in a rapid manner, focus upon certain flexibly-defined categories of products in an assortment analysis, accurately identify the success or failure of a product assortment to carry the most popular revenue generating products, accurately identify the popularity of products (from most to least popular) for the geographic market or a chain of stores, and predict how changes in the assortment of products carried by the store would affect the revenues of a store.

SUMMARY OF THE INVENTION

It is therefore an object of the present invention to provide retail stores in general, and grocery and supermarket stores in particular, with a system capable of analyzing large amounts of retail sales data for all products and all manufacturers in a given product category sold in a geographic market and/or a chain of stores in a quick manner. Types of data analyzed by the present system include:

Chain Data—for a given product category, this data would reflect sales of items from all producers for a store or chain of stores.

Market Data—for a given product category, this data would reflect sales of items from all producers for a given market (e.g. geographical). This data can be combined to show how a chain in a specific market is performing relative to the entire market.

Another object of the present invention is to allow the system user to flexibly create and revise categories of products based upon criteria selected by the user including product name, food type, flavoring, package size and package type. Categorization of products is defined by category segment where a product category is a general description of product and a product segment is a particular description of a product. For instance, salty snacks would be a general product category, while pretzels or potato chips would be a particular product segment of the salty snacks category. Other useful categories, such as all salty snack foods or all warehouse container products (e.g.., tins, canisters) can be used in the analysis to determine what the optimum variety of products should be carried in a particular chain of stores and/or geographic area.

Further, it is an object of the present invention to determine how a store's present assortment of products is succeeding or failing to cover the market demand with the items carried by the store. In analyzing the revenue-generating capability of an assortment of products, the following terms are used:

Percent Product Coverage—the items carried by a chain in a product segment divided by the total number of items in the market for that product segment. The percent product coverage will indicate how many items are carried by the chain versus the total number of items available in the market. For instance, a 100% product coverage for a chain would mean all the available products in that product segment are carried by the chain, whereas a 50% product coverage would mean the one half of the available products in that product segment are carried by the chain.

Percent Market Demand—the market sales for items carried by a chain divided by the total market sales for all items in a product segment. The percent market demand will show how many of the total sales in the market for all items in a segment are covered (by percentage) by the items carried by the chain. For instance, a 100% market demand for items carried by a chain would mean that all the market sales for products in that segment are covered by the items carried by a chain, while a 75% market demand for items carried by a chain would mean that the market sales for products carried by the chain cover only three quarters of the total market sales for all products in that segment.

Market Coverage—using the percentage product coverage and the percentage market demand, the market coverage would indicate how much of the total sales for products in the market for a segment are being covered by the product selection carried by the chain. If a chain has 50% product coverage and a 92% market demand, the store's product coverage is said to be 92% of the revenue in the market is covered by the store's assortment of only one-half (50%) of the available products in the market. This indicates the store has selected a fairly popular variety of items compared to the total number of items available in that market. This analysis answers the question "Is this store/chain carrying the correct assortment of popular items?"

Yet another object of the present invention is to identify the more popular and least popular products by defined categories thereby facilitating assortment management optimization. Because a better assortment of more popular items translates into more profits, optimization of the more popular products for a given shelf space should maximize profits. The present system can classify the products in the market or carried by a chain into classes of products depending on their popularity. The following term is used to define this popularity class:

Velocity Class—a measurement of the average throughput of an item sold by a store handling that item over a certain time period. This classification answers the question "for each item in that chain, what is average unit weekly sales per store handling that item?" For example, a first product may have an average throughput of 6 units per week per store handling that item and a second product may have an average throughput of 33 units per week per store handling. On a scale of 1 to 7 (1 being most popular and 7 being least popular), the velocity class of the first product may be 5 and the velocity class of the second product may be 1. In this example, this type of analysis would provide the store with an easy to understand classifications for describing products in an assortment with average throughput values, such as velocity classes.

Another object of the present invention is to identify the best assortment or variety of popular products based upon an analysis of retail sales data for all stores in a particular geographic region or a chain of stores in a geographic area. Assortment planning analysis, also called "what if analysis" evaluates items based upon the designated velocity class to identify slow moving items and fast moving items, and determine if there are items which can be added to or deleted from an assortment to increase revenues. Assortment planning analysis includes conducting hypothetical analysis into revenue generation based upon adding or deleting products from an assortment carried by a store or chain. For example, by eliminating some of the products with high velocity classifications (less popular) and adding some of the products with low velocity classifications (high popularity), a store may expect a significant shift in revenues.

Another object of the invention is to produce quality graphical and tabular outputs for the market coverage analysis, the velocity class analysis, and the assortment planning analysis. Tabular outputs may include general or detailed information, and the graphical information may be presented in a pie chart or in a bar chart format. Presentation quality charts and tables are capable of being automatically generated by the system for overhead or notebook presentations.

Overall, the present invention is capable of analyzing large amounts of retail sales data by reformatting and manipulating the sales data in an automated manner to analyze the market coverage of store's present assortment, identify the most and least popular products in the market, determine how changes in inventory can effect the revenue generated by a store, provide recommendations on more profitable varieties of products the store could be carrying on its shelf space, and produce easy to understand graphical and tabular output charts supporting the analysis.

While the present invention is described in the preferred embodiment with respect to the package food product market, the invention is capable of use in any general retail sales analysis to flexibly categorize products, determine the popularity of products in a market and conduct analysis to optimize the assortment of products carried by a store or chain of stores. Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the invention particularly covered by the appended claims.

BRIEF DESCRIPTION OF THE DRAWINGS

The objects and features of the invention will become more readily understood from the following detailed description and appended claims when read in conjunction with the accompanying drawing in which like numerals represent like elements and in which:

FIG. 5 is the second page of a flowchart for importing chain and market files into the program for analysis;

FIG. 6 is the third page of a flowchart for importing chain and market files into the program for analysis;

FIG. 13 is the screen output for category definition with tabular summary data;

FIG. 14 is the screen output for category definition showing tabular recap information for the category definition;

FIG. 16 is the screen output to initiate market coverage analysis;

FIG. 17 is the screen output to designate sorting order for market coverage analysis;

FIGS. 19–21 are the screen outputs to initiate assortment planning analysis with all items, added items, and de-listed items shown, respectively;

FIG. 22 is the tabular output chart for category definition recap information;

FIG. 23 is the tabular output chart for market structure and demand coverage by chain assortment;

FIG. 24 is the tabular output chart for market coverage analysis;

FIG. 25 is the output chart for velocity class analysis;

FIG. 26 is the tabular output chart for velocity class by manufacturer;

FIG. 27 is the output chart for sales profile for the average store;

FIG. 28–29 are the tabular output charts for velocity class analysis;

FIGS. 30–31 are the tabular output charts for velocity class analysis by subcategory and by manufacturer;

FIG. 38 is a tabular output chart for a salty snack category velocity class analysis;

FIG. 39 is a tabular box output chart for an assortment planning analysis, Alternative #1;

FIG. 40 is the tabular output chart for market structure and demand coverage by chain assortment for an alternative #1 assortment planner; and FIG. 41 is a tabular output chart for projected weekly sales of assortment planner alternative #1.

DETAILED DESCRIPTION OF THE PREFERRED EMBODIMENTS(S)

Reference should now be made to the flowcharts in the appended figures for a more detailed explanation of the category definition and variety optimization system. The process flow of the system is explained with flowchart diagrams. Preferably, the system is implemented on a microprocessor-based machine having sufficient memory space to accommodate the significant data used in the analysis, but it is readily understood that the system could be implemented on any type of computer system having a arithmetic/logic processor, memory and input/output devices such as screens, keyboards and disk drives.

Figure 1:
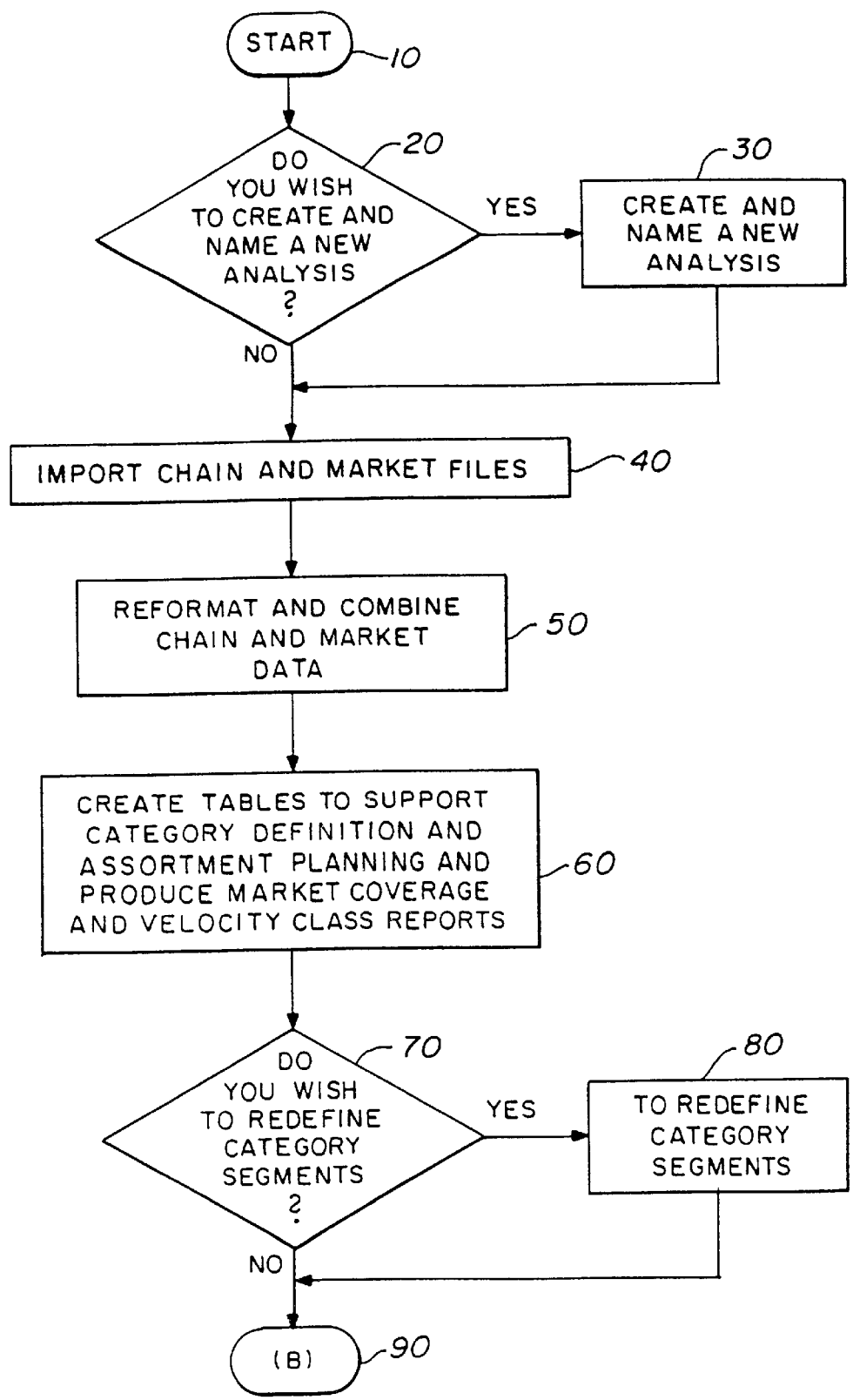
FIG. 1 is the first page of a flowchart for the general program operation.

Referring to FIG. 1 of the preferred embodiment, the general program operation begins at step 10 and proceeds to step 20 where the user decides whether to create and name a new analysis. If the response at step 20 is YES, the program operation proceeds to step 30 where the user will create and name the new analysis followed by the program operation proceeding to step 40. If the answer at step 20 is NO, the program operation will proceed directly to step 40. In step 40, the program will import specific chain and market files and proceed to step 50 where the chain and market files will be reformatted and combined. Market data includes retail sales data for all products sold in a given product category, regardless of manufacturer, for a geographic area. Chain data includes retail sales data for all products sold, regardless of manufacturer, for a chain of stores.

For example, retail sales data for potato chips in the Denver area would be market data. Retail sales data for potato chips in Albertson's stores would be chain data. Chain and market data can be combined to show retail sales performance for a chain of stores in a geographic market, such as all Albertson's stores in the Denver area.

The present invention can accept chain and market data, and this data will be manipulated by the category definition analysis to focus upon market areas of interest, such as a specific brand, food type, container size, or container type. The present invention is very useful in accepting large quantities of retail sales data for the market or chain, and manipulating the data into a more manageable format for focused analysis.

Following step 50, the program operation proceeds to step 60 where tables will be created to support category definition and assortment planning activities. At step 60, market coverage and velocity class reports will also be produced. After step 60, the program operation proceeds to step 70 where the user will decide whether to redefine category segments. If the answer at step 70 is YES, the program operation will proceed to step 80 where the program operation will redefine the category segments followed by the program operation proceeding to step (b) at step 90. If the response at step 70 is NO, the program operation will proceed directly to step (b) at step 90.

Figure 2:
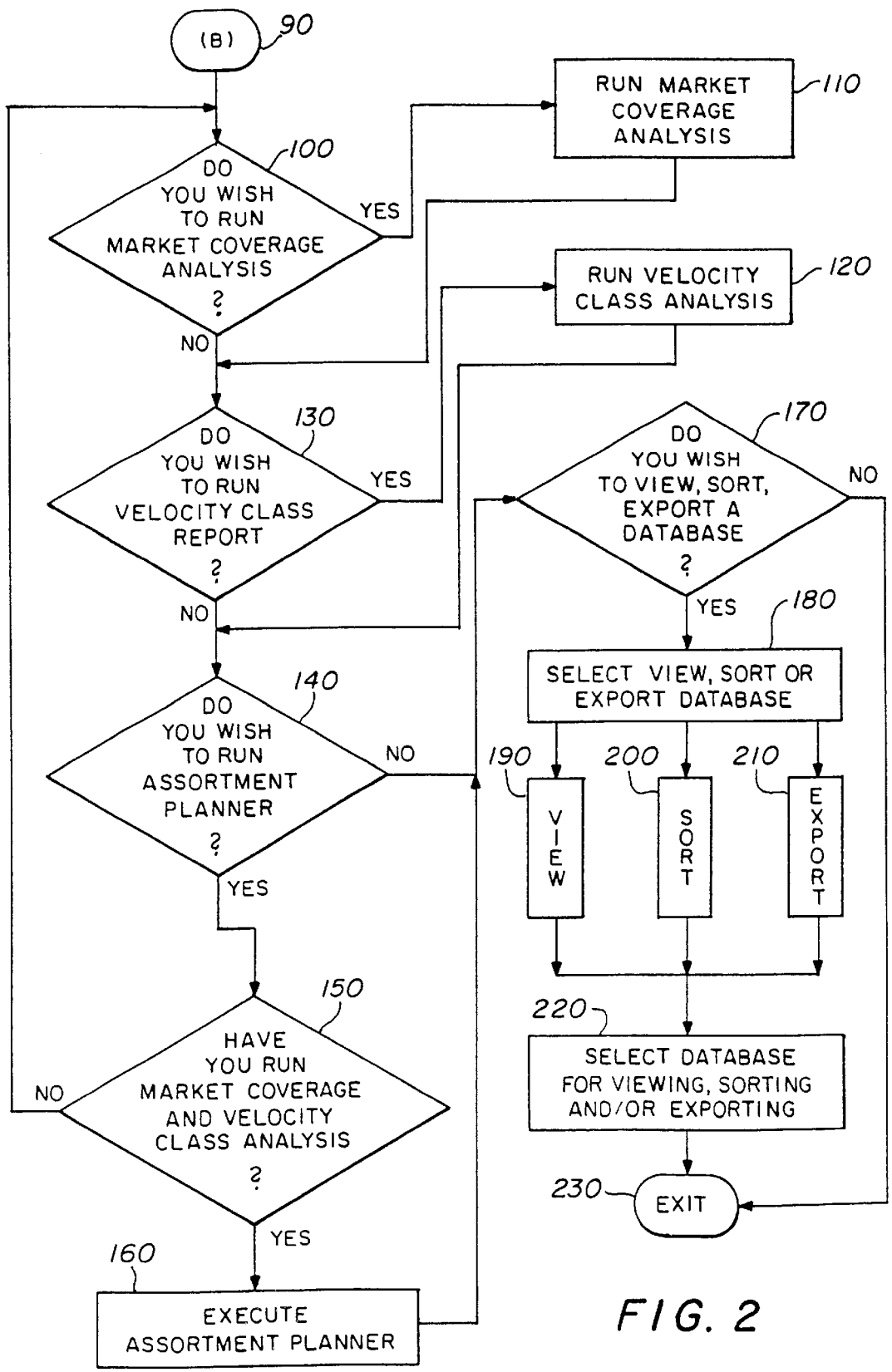
FIG. 2 is the second page of a flowchart for the general program operation.

Step 90 designated by step (b) begins the general program operation in FIG. 2. After step 90, the program operation will proceed to step 100 where the user will decide whether to run market coverage analysis. If the answer at step 100 is YES, the program operation will proceed to step 110 where the market coverage analysis will proceed and the program operation will proceed to step 130. If the answer at step 100 is NO, the program operation will proceed directly to step 130. At step 130, the user will decide whether to run a velocity class report analysis. If the answer at step 130 is YES, the program operation will proceed to step 120 where the velocity class report analysis will be conducted and the program operation will proceed to step 140. If the user decides not to run a velocity class report in step 130, the program operation will proceed directly to step 140.

In step 140, the user will decide whether to run an assortment planner analysis. If the answer is NO at step 140, the program operation will proceed to step 170. If the answer is YES at step 140, the program operation will proceed to step 150 where the user must indicate whether market coverage and velocity class analysis has been conducted. If the answer is NO at step 150, the program operation will proceed back to step (b) at step 90. If the answer at step 150 is YES, the assortment planner analysis will be executed at step 160. After step 160, the program operation will proceed to step 170.

At step 170, the user will decide whether to view, sort or export the database. If the answer is NO at step 170, the program operation will proceed to step 130 where the general program operation will be completed. If the answer is YES at step 170, the program operation will proceed to step 180 where the operation of selecting view, sort or export of database will be made. After step 180, the program operation will proceed to step 190 for exporting of data, step 200 for sorting of data, or step 210 for viewing of data. After steps 190, 200 and 210, the program operation will proceed to step 220 where the database will be selected and the operation of viewing, sorting and/or exporting of the database will occur. After step 220, the program operation will proceed to step 230 where the program operation will exit the general operation program.

Figure 3:
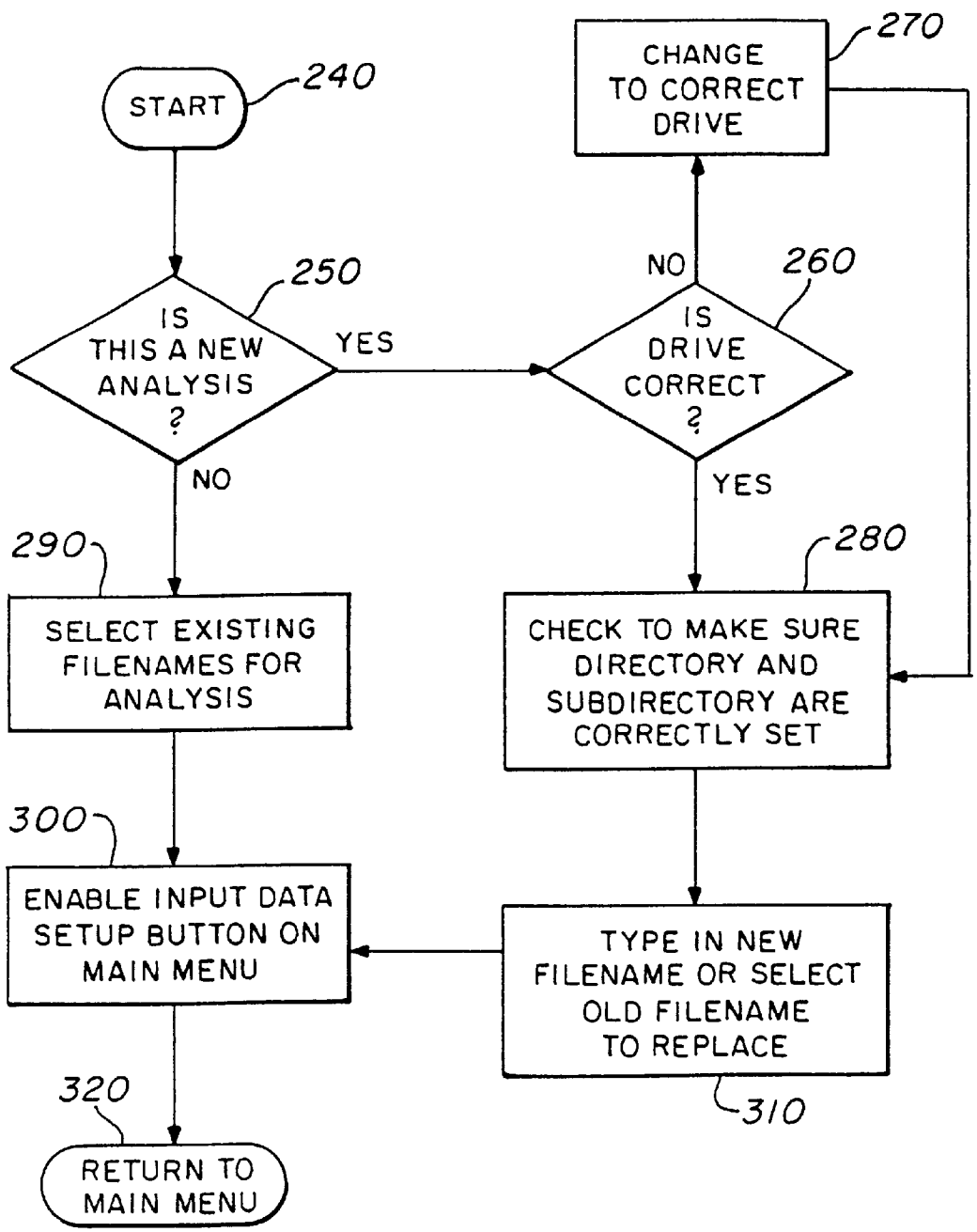
FIG. 3 is the flowchart for creating and naming a new analysis.

Creating and naming of a new analysis is described in FIG. 3 and starts at step 240. After step 240, the program operation will proceed to step 250 where the user will decide whether this is a new analysis. If the answer at step 250 is YES, the program operation will proceed to step 260 where the user will decide if the computer disk drive is correct. If the answer is NO, the program operation will proceed to step 270 where the user may change the computer disk drive. If the answer at step 260 is YES, the program operation will proceed to step 280 where the user may check to make sure the directory and subdirectories are correctly set. After step 280, the program operation will proceed to step 310 where the user will type in the new file name or select the old file name. If a new analysis is conducted using an old filename, the new analysis will replace the old analysis at that filename. After step 310, the program operation will proceed to step 300.

If the user answers NO at step 250, the program operation will proceed to step 290 where the user may select an existing file name for analysis. After step 290, the program operation will proceed to step 300 where the user will enable the input data setup button on the main menu. After step 300, the program operation will proceed to step 320 where the program operation will return to the main menu.

Figure 4:
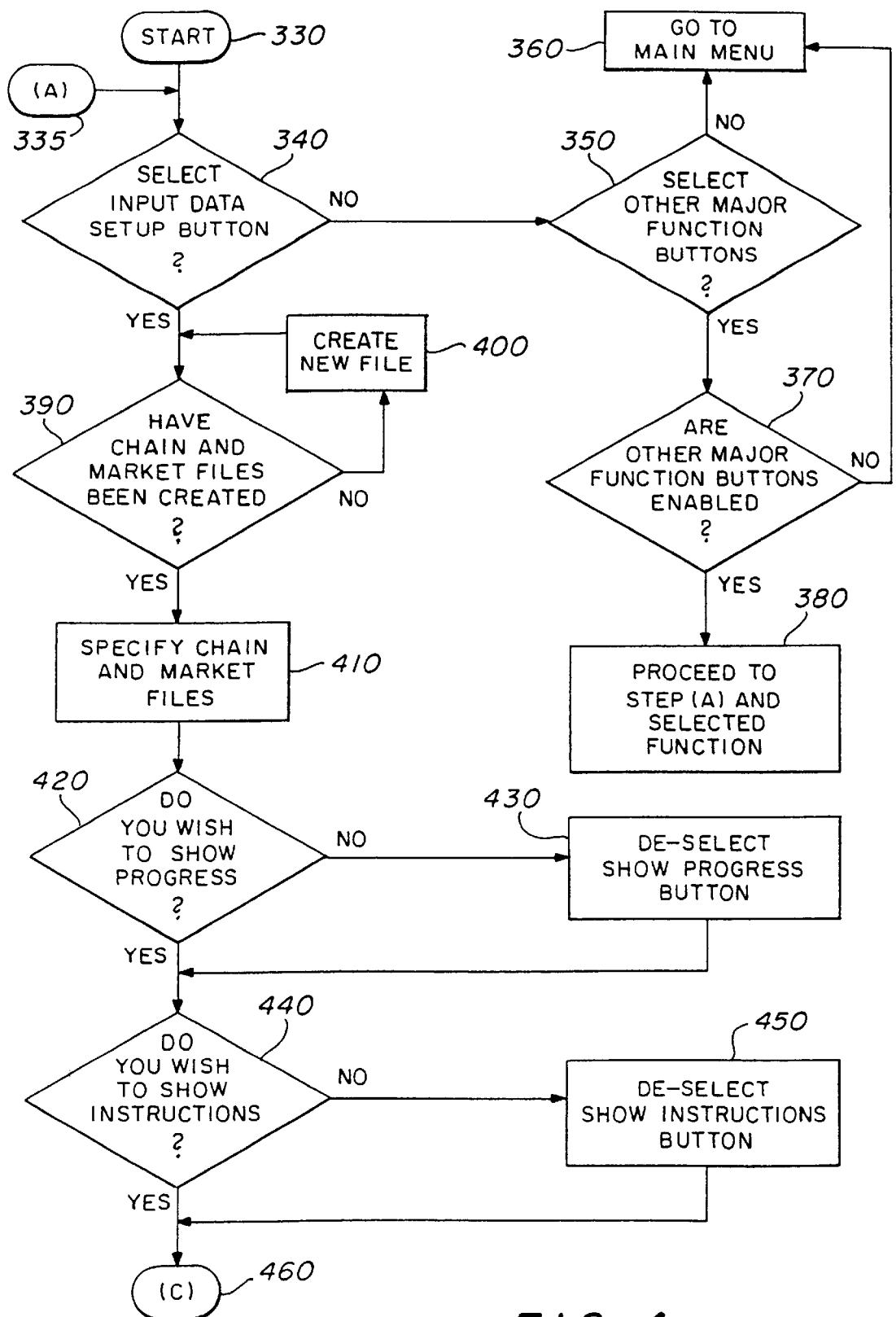
FIG. 4 is the first page of a flowchart for importing chain and market files into the program for analysis.

Inputting chain and market files is described in FIG. 4 and starts at step 330. After step 330, the program operation will proceed to step 340 where the user will decide whether to select the input data setup button. If the user decides not to select the input data setup button, the program operation will proceed from step 340 to step 350 where the user will decide whether to select other major function buttons. If the answer at step 350 is NO, the program operation will proceed to step 360 where the program operation will maintain the main menu screen. After step 360, the program operation will proceed to step (a) at step 335.

If the answer is YES at step 350, the program operation will proceed to step 370 where the user will decide whether the other major function buttons are enabled for selection. If the answer is NO at step 370, the program operation will proceed to step 360 where the main menu screen will be maintained. If the answer is YES at step 370, the program operation will proceed to step 380 where the program operation will proceed with the selected function and return to the beginning of the import chain and market files portion of the program operation at step (a) at step 335.

If the answer is YES at step 340, the program operation will proceed to step 390 where the user will decide whether chain and market files have been created. If the answer is NO at step 390, the program operation will proceed to step 400 where the creation of the new files will occur. After step 400, the program operation will proceed back to step 390. If the answer is YES at step 390, the program operation will proceed to step 410 where the user will specify chain and market files. At step 410, the program user can designate the chain and market files, or the program user can change the designated chain and market files. The chain and market files can be combined by selecting the combine button. The chain and market files can be combined automatically by appending the chain data to an empty chain data file then appending a market file to that chain data. After merger of the appended data, the files will be combined for analysis.

The program operation will proceed to step 420 where the user will decide whether the progress of any requested activity will be shown. In a default situation, the progress of the requested activity will be shown during the activities of data retrieval and combination. If the answer is NO at step 420, the program operation will proceed to step 430 where the user will de-select a show progress button. After step 430, the program operation will proceed to step 440. If the answer is YES at step 420, the program operation will proceed to step 440.

At step 440, the user will decide whether the instructions as the actions performed by the program will be shown. In a default situation, the instructions of the program for retrieving and combining data files will be shown as the instructions are executed. If the answer is NO at step 440, the program operation will proceed to step 450 where the user may de-select the show instructions operation. After step 450, the program operation will proceed to step (c) at step 460. If the answer at step 440 is YES, the program operation will proceed to step (c) at step 460.

The flow chart for the import chain and market files portion of the program operation continues on FIG. 5 starting at step (c) at step 460. After step 460, the program operation will proceed to step 480 where the data from selected files is imported and reformatted into the original file for chain and market data. After step 480, the program operation will proceed to step 490 where the program operation will decide whether the show progress button has been selected. If the answer is YES at step 490, the program operation will proceed to step 500 where the program operation will show the progress as the importation and reformatting of data takes place. After step 500, the program operation will proceed to step 510. If the answer is NO at step 490, the program operation will proceed to step 510.

At step 510, the program operation will decide whether the show instructions button has been selected. If the answer is YES at step 510, the program operation will proceed to step 520 where it will show the instructions as they are taking place during the importation and reformatting of data. After step 520, the program operation will proceed to step 530. If the answer is NO at step 510, the program operation will proceed to step 530.

At step 530, the program operation will decide whether the selected file importation is complete. If the answer at step 530 is NO, the program operation will proceed to step 540 where the program operation will wait and then return to step 530. If the answer is YES at step 530, the program operation will proceed to step 550.

At step 550, the user may indicate whether the imported files are correct. If the answer is NO at step 550, the program operation will proceed to step 560 where the user may re-select files using new file names. At step 550, the user also has the opportunity to verify that the files are correct. After step 560, the program operation will proceed to step 480.

If the imported files are correct, the program operation will proceed from step 550 to step 570 where the chain and market files will be combined. After step 570, the program operation will proceed to step (d) at step 580.

The operation of the importation and reformatting of chain and market files continues at FIG. 6 starting at step (d) at step 580. After step 580, the program operation will proceed to step 590 where the program operation will decide whether the merger of the chain and market files is complete. If the answer is NO at step 590, the program operation will proceed to step 600 where the program operation will wait, and then the program operation will proceed back to step 590. If the answer is YES at step 590, the program operation will proceed to step 610 where, based on the selection of the user, the program operation will display the combined files, the chain files, or the market files.

After step 610, the program operation will proceed to step 620 where the user may input whether he is done with the program operation. If the answer is NO at step 620, the program operation will proceed back to step 610. If the user is done and the answer is YES at step 620, the program operation will proceed to step 630 where the user may hit the done button.

After step 630, the program operation will proceed to step 640 where processing will be initiated to create a category definition, market coverage analysis and velocity class analysis tables. After step 640, the program operation will proceed to step 650 where the program operation will signal completion of the creation of tables for category definition, market coverage analysis and velocity class analysis. After step 650, the program operation will proceed to step 660 where the program operation will return to the main menu.

Figure 7:
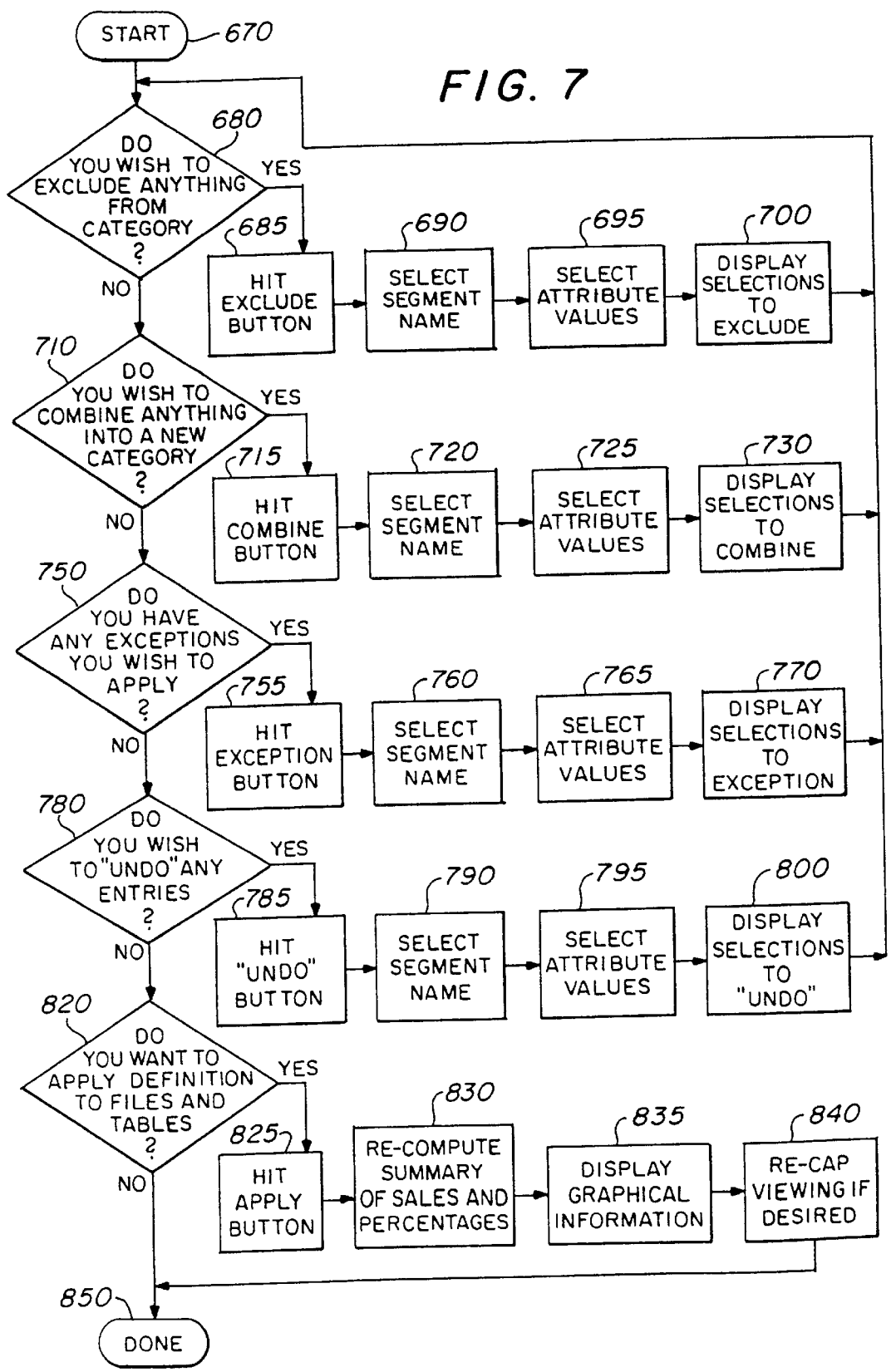
FIG. 7 is a flowchart for category definition.

As shown in FIG. 7, the category definition operation is shown beginning at step 670. After step 670, the program operation will proceed to step 680 where the user may input whether the user wishes to exclude anything from a category definition. If the answer is NO at step 680, the program operation will proceed to step 710 where the user may indicate a desire to combine data into a new category. If the answer is NO at step 710, the program operation will proceed to step 750 where exceptions may be applied if the user desires. If the answer is NO at step 750, the program operation will proceed to step 780 where the user may indicate whether the user wishes to "undo" any entries. If the answer is NO at step 780, the program operation will proceed to step 820 where the user will indicate whether it wishes to apply the category definition chosen to the combined files in the table. If the answer is NO at step 820, the program operation will proceed to 850 where the category definition operation is done.

If the answer is YES at step 680, the program operation will proceed to step 685 where the user will hit the exclude button. The exclude operation allows the user to exclude a product component from the analysis. A product component may include a product category, a product sub-category, or product category or any other type of attribute value. After step 685, the program operation will proceed to step 690 where the user may select segment names to exclude and then proceed to step 695 where the user may select attribute values to exclude. For instance, a product segment can include sub-categories of products, and attribute values can be defined as package type, vendor, brand, flavor base and size range. After step 695, the program operation will proceed to step 700 where the program operation will display the user's selections for exclusion. After step 700, the program operation will proceed back to step 680.

If the answer is YES at step 710, the program operation will proceed to step 715 where the user may hit the combine button. The combine operation will combine various product components into a single category. A product component, as used herein, is defined above. After step 715, the program operation will proceed to step 720 where the user may select segment names to combine and then proceed to step 725 where the user may select attribute values to combine. After step 725, the program operation will proceed to step 730 where the user's selections will be displayed. After step 730, the program operation will proceed to step 680.

If the answer is YES at step 750, the program operation will proceed to step 755 where the user may hit the exception button. The exception operation allows the program user to exclude product components from data out of a combined category of data. A product component, as used herein, is defined above. After step 755, the program operation will proceed to step 760 where the program operation will select a segment name. After step 760, the program operation will proceed to step 765 where the program operation will select attribute values. After step 765, the program operation will proceed to step 770 where the program operation will display selections made by the user or exceptions from the category. After step 770, the program operation will proceed to step 680.

If the answer is YES at step 780, the program operation will proceed to step 785 where the user may hit the undo button. Essentially, the "undo" operation allows the program user to reset a product component setting to its original state. A product component, as used herein, is defined above. After step 785, the program operation will proceed to step 790 where the user may select the segment name he wishes to undo from the analysis. After step 790, the program operation will proceed to step 795 where the user may select the attribute value to undo from the analysis. After step 795, the program operation will proceed to step 800 where the program operation will display selections made by the user to undo from the analysis. After step 800, the program operation will proceed to step 680.

If the answer is YES at step 820, the program operation will proceed to step 825 where the user may hit the apply button. After the apply button is pressed, the program operation will manipulate the selected retail sales data into the desired category definition. The program user may focus on certain areas of the market by including the desired categories in the analysis, while the program user may disregard other areas of the market by excluding those areas from his analysis. Other areas of the market may be combined with the category definition portion of this program. Overall, the program user has tremendous flexibility in defining a category for focused analysis while excluding irrelevant data from the analysis.

Figure 15:
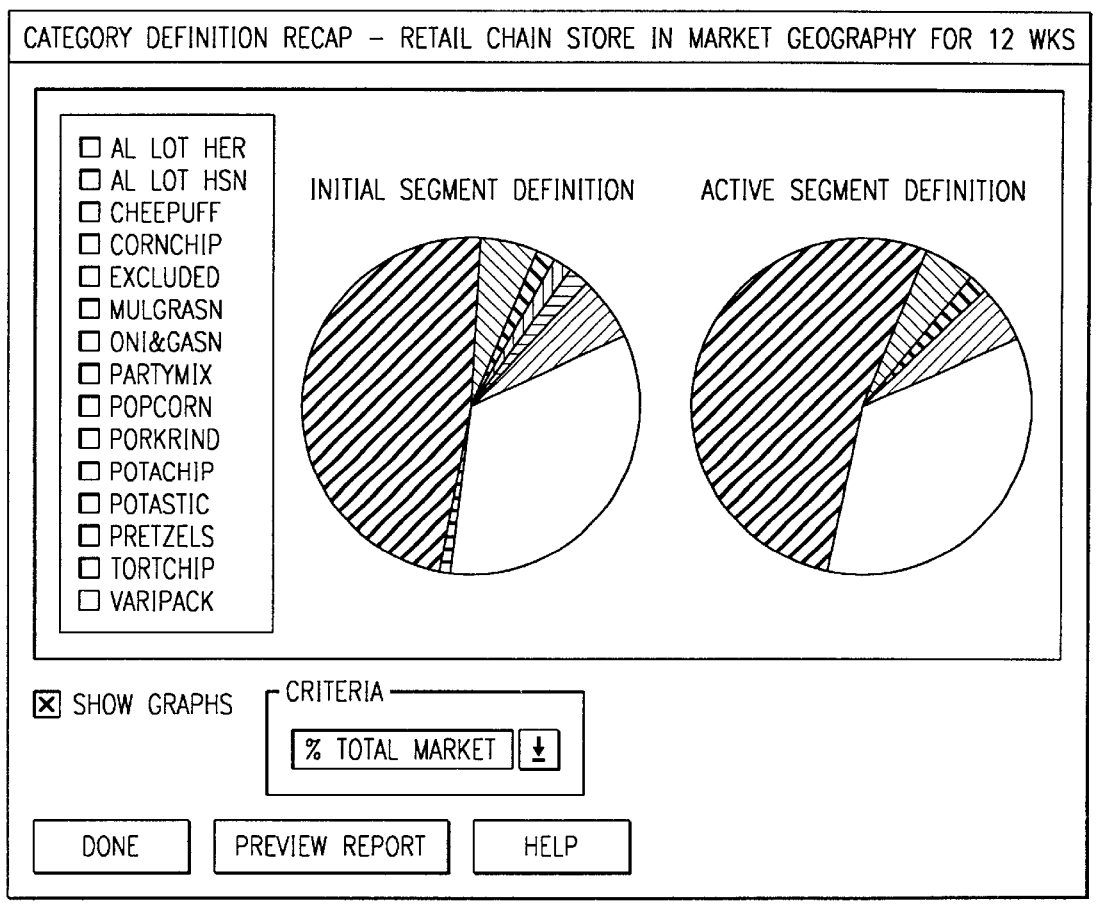
FIG. 15 is the graphical output screen for category definition recap information.

FIGS. 13–15 show screen outputs for the category definition functions of the program. FIG. 13 shows the screen output with a tabular chart of summary data for included, excluded or combined categories of the products in the market. Instead of tabular data, graphical pie chart data may also be selected and displayed. As shown in FIG. 14, the category definition feature also provides recap information on the defined category by ascending order of the product segment, initial count of items in the market, active count of items in the market, active sales in the market, initial total percentage of market, and active total percentage of market. Recap information for the defined category can also be displayed in descending order for the same market attributes identified in FIG. 14.

FIG. 15 shows a pie chart graphical output screen for the selected category definition recap information in total percent market. The pie chart graphical output screen for the selected category definition recap information may also display item count.

After step 825, the program operation will proceed to step 830 where the program operation will recompute the summary of money and percentage figures. After step 830, the program operation will proceed to step 835 where it will display graphical information. After step 835, the program operation will proceed to step 840 where the program operation will recap viewing if desired. A detailed report can also be selected. One such detailed report is shown in FIG. 22. After step 840, the program operation will proceed to step 850 where the category definition portion of the program operation will be completed.

Figure 8:
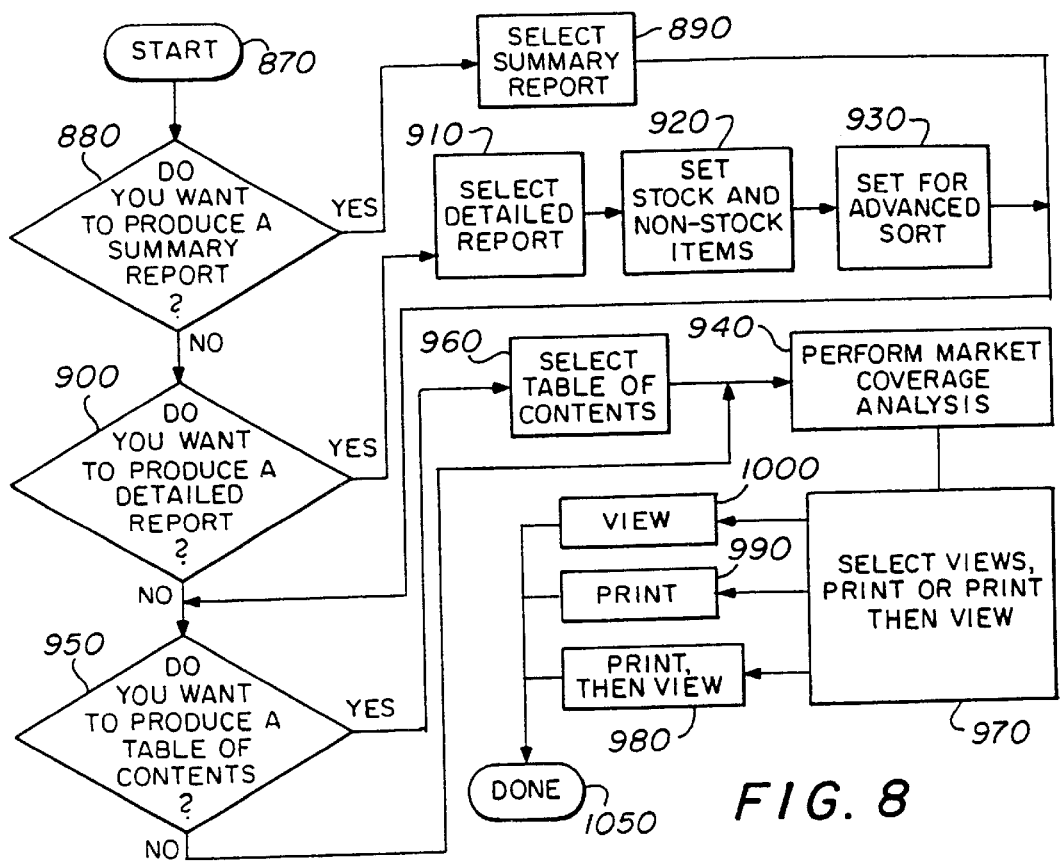
FIG. 8 is a flowchart for market coverage analysis.

As shown in FIG. 8, the market coverage analysis begins at step 870 and proceeds to step 880. At step 880, the user will indicate whether the user wants to produce a summary report. If the answer is YES at step 880, the program operation proceeds to step 890 where the user may select the summary report. After step 890, the program operation will proceed to step 950.

If the answer is NO at step 880, the program operation will proceed to step 900 where the user may indicate whether the user wants to produce a detailed report. If the answer is YES at step 900, the program operation will proceed to step 910 where the user will select a detailed report. After step 910, the program operation will proceed to step 920 where the user may select certain stock or non-stock items. After step 920, the program operation will proceed to step 930 where the user may set the selections for an advanced sort. After step 930, the program operation will proceed to step 950.

If the answer at step 900 is NO, the program operation will proceed to step 950 where the user will indicate whether a table of contents should be produced for the market coverage analysis. If the answer is YES at step 950, the program operation will proceed to step 960 where the user may select the table of contents option. If the answer is NO at step 950, the program operation will proceed directly to step 940 where the market coverage analysis is performed.

Market coverage analysis utilizes selected categories of market and chain data to calculate percent market demand and market coverage. Percent product coverage (PPC) is calculated using the equation:

$$PPC=(x/y)*100$$

where "x" equals the number of different items in a product segment which are carried by a store and "y" equals the total number of different available items in a product segment for the entire market area. For example, if 32 items are available in the market and a store carries only 24 of those items, that store's percent product coverage {PPC) would equal 75%.

Percent market demand (PMD) is calculated using the equation:

$$PMD=(a/b)*100$$

where "a" equals revenues in the market for the products in a product segment carried by the store and "b" equals the revenues in the market for all products in that product segment. In the above example, if the 32 products in the product segment of the market generate $20,000.00 and the 24 products carried by the store generate $19,000 in revenues for the market, the percent market demand would equal 95%. This is a fairly good percent market demand.

The market coverage is a comparative analysis of the percent market demand for the percent product coverage. Thus, the market coverage in the example would be 95% of the market demand is covered by 75% of product coverage for the store's product selection. The market coverage will highlight how many (or how few) of the popular items in the market are being carried by the store. A lower percent product coverage with the same, or higher, percent market demand is preferable because the only way to achieve that result is to eliminate the less popular products from a store's assortment while adding more popular revenue generating products to the assortment. This is the preferred product assortment optimization for a store—alter the assortment to generate more revenues with the same number or less products.

A lower percent market demand in combination with the same (or higher) percent product coverage is not the preferable situation. A store encounters this situation when it substitutes more popular products with less popular products. Essentially, the store is carrying the same number of products but each product is generating less revenue than the prior selection. This situation is the opposite of the product variety optimization.

As shown in FIG. 16, the screen output for market coverage analysis is shown where the market category abbreviations, market category descriptions, category segments and report sequences are shown. The selection of report type is also shown in this output screen. Advanced sorting order can also be set in the output screen for market coverage analysis in FIG. 17. This sorting order will be shown in the report sequence of screen of FIG. 17 and will dictate the order for the detailed reports generated for market coverage analysis. Two portions of the detailed reports are shown at FIGS. 23 and 24.

After step 940, the program operation will proceed to step 970 where the user may select the options to view the report, print the report or print then view the report. After step 970, the program operation will proceed to steps 1000 to view the report, step 990 to print the report, or step 980 to print then view the report. After steps 1000, 990 or 980, the program operation will proceed to step 1050 where the market coverage analysis will be completed.

Figure 9:
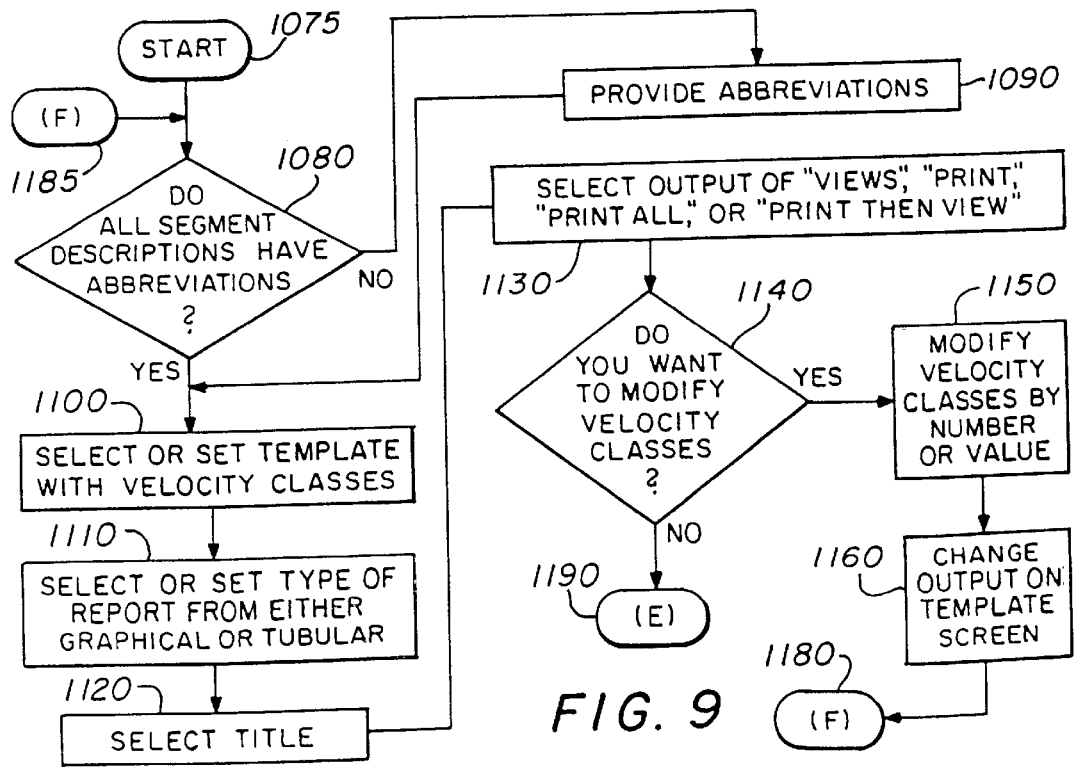
FIG. 9 is the first page of a flowchart for velocity class analysis.

The velocity class analysis flow chart is shown in FIG. 9 and starts at step 1075. The velocity class analysis groups items into product segments by ranges of average throughput of a product for a store handling that product over a period of time. Seven velocity classes have been used to show the average throughput of a product for a store handling over a period of time. One example of a seven class velocity class analysis is shown on FIG. 25 where the velocity classes are set as:

| Class | Velocity Range | |
|---|---|---|
| 7 | 1 or less | |
| 6 | 1–2 | |
| 5 | 3–4 | |
| 4 | 5–8 | |
| 3 | 9–16 | |
| 2 | 17–32 | (average unit throughput per store |
| 1 | 32+ | handling per average week) | and velocity range equals products sold by a store per week. Class 7 is the smallest velocity class value whereas Class 1 is the largest velocity class. Average throughput is a measure of the average quantity of a single product purchased during a time period. This measurement takes the total number of products sold during a time period and divides that number by the stores handling that product for that time period. For instance, if the quantity of sales for a product equals 50 for a week period and there are ten (10) stores handling the product, the average throughput is 5 units per week per store handling. The velocity class for this product would velocity class 4.

After step 1075, the velocity class analysis will proceed to step 1080 where the user will indicate whether abbreviations exist for all segment descriptions. If the answer is NO at step 1080, the program operation will proceed to step 1090 where the user will provide appropriate abbreviations and then the program operation will proceed to step 1100. If the answer is YES at step 1080, the program operation will proceed to step 1100 where the user will select or set a template with the velocity classes. After step 1100, the program operation will proceed to step 1110 where the user will select and set the type of report from either a tabular or graphical output. After step 1110, the program operation will proceed to step 1120 where the user may select a title. After step 1120, the program operation will proceed to step 1130 where the user can select the output options of viewing, printing, printing then viewing, or printing all.

Figure 18:
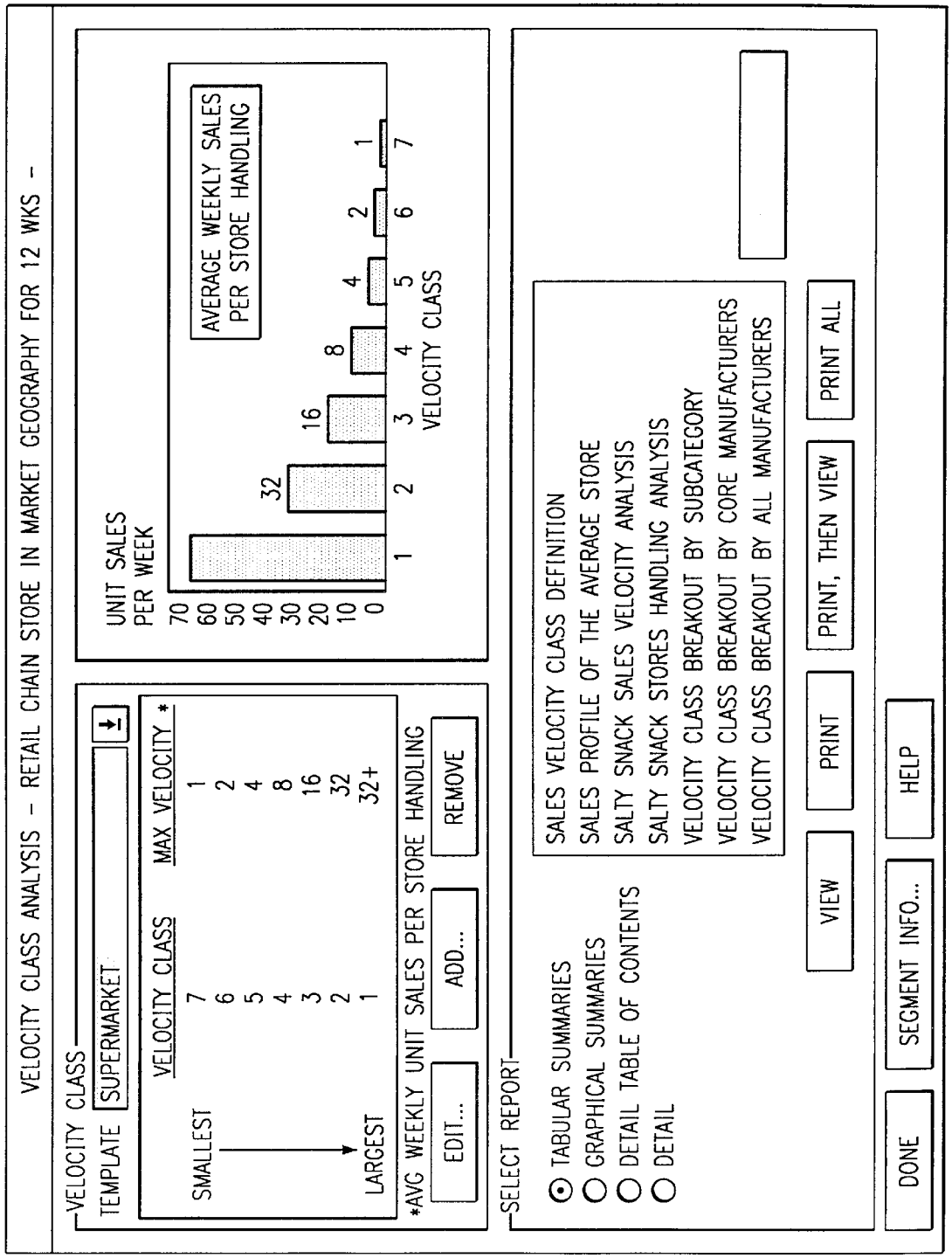
FIG. 18 is the screen output to initiate velocity class analysis with different numbers of velocity classes.

After step 1130, the program operation will proceed to step 1140 where the user may indicate whether he wants to revise the velocity classes. If the answer is YES at step 1140, the program operation will proceed to step 1150 where the user may modify the velocity classes by the number of classes or the values for those classes. An output screen is shown in FIG. 18 where seven velocity classes are selected. If the program user wishes to select less velocity classes, an output screen may be selected to change the number of velocity classes or different ranges for the velocity classes can be selected with different values per velocity class. After step 1150, the program operation will proceed to step 1160 where the user can change the output on the template screen. After step 1160, the program operation will proceed to step 1180 where the program operation will proceed to step (f) at step 1185. If the answer is NO at step 1140, the program operation will proceed to step 1190 where the program operation will proceed to step (e).

Figures 10, 11:
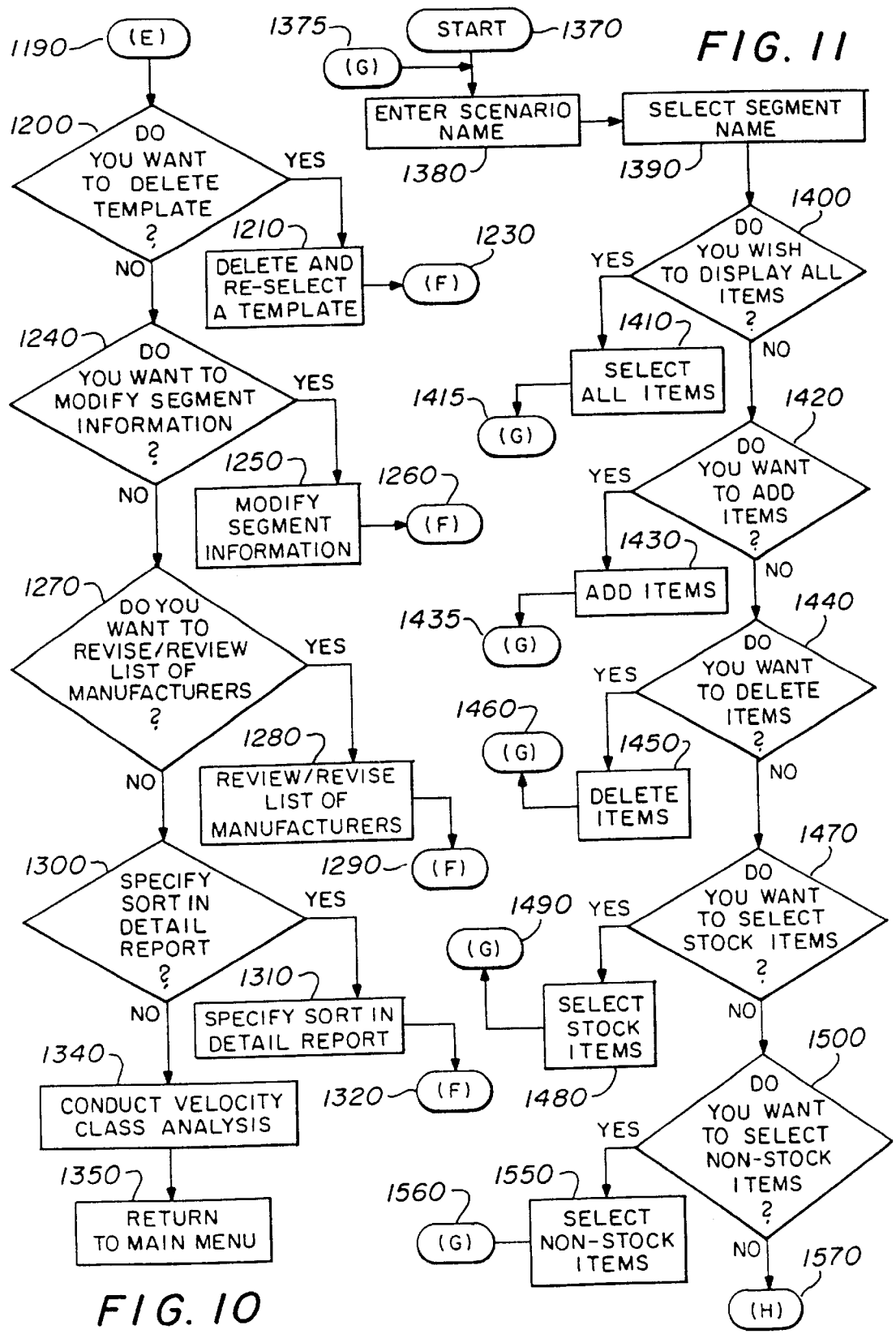
FIG. 10 is the second page of a flowchart for velocity class analysis.
FIG. 11 is the first page of a flowchart for assortment planning analysis.

The velocity class analysis continues at FIG. 10, starting at step (e) at step 1190. After step 1190, the program operation proceeds to step 1200 where the user may indicate whether it wishes to delete a template. If the answer is YES at step 1200, the program operation proceeds to step 1210 where a template may be deleted and re-selected. After step 1210, the program operation proceeds to step 1230 which indicates the program operation will proceed to step (f) at step 1185.

If the answer is NO at step 1200, the program operation will proceed to step 1240 where the user may indicate a desire to modify segment information. If the answer is YES at step 1240, the program operation will proceed to step 1250 where the user may modify the segment information. After step 1250, the program operation will proceed to step 1260 where the program operation will proceed to step (f) at step 1185.

If the answer is NO at step 1240, the program operation will proceed to step 1270 where the user may indicate a desire to revise or review the list of manufacturers. If the answer is YES at step 1270, the program operation will proceed to step 1280 where the user may review and revise the list of manufacturers. After step 1280, the program operation will proceed to step 1290 where the program operation will proceed to step (f) at step 1185.

If the answer is NO at step 1270, the program operation will proceed to step 1300 where the user may indicate a desire to specify a sort order in the detailed report. If the answer is YES at step 1300, the program operation will proceed to step 1310 where the user may specify the sorting routine for the detailed report. Sorting for the velocity class analysis output can also be set at an output screen. After step 1310, the program operation will proceed to step 1320, where the program operation will proceed to step (f) at step 1185.

If the answer is NO at step 1300, the program operation will proceed to step 1340 where the program operation will execute velocity class analysis and output the data as requested. Detailed final charts for velocity class analysis include FIGS. 25–38. FIG. 25 is a an overview of the velocity class definition used in the analysis, while FIG. 26 is the velocity class breakdown by manufacturer where each product manufacturer has its items in production broken down by velocity class. FIG. 27 is the sales profile of the average store where average revenues for stocked items is calculated with average weekly sales, sales volume and dollar volume.

Figure 32:
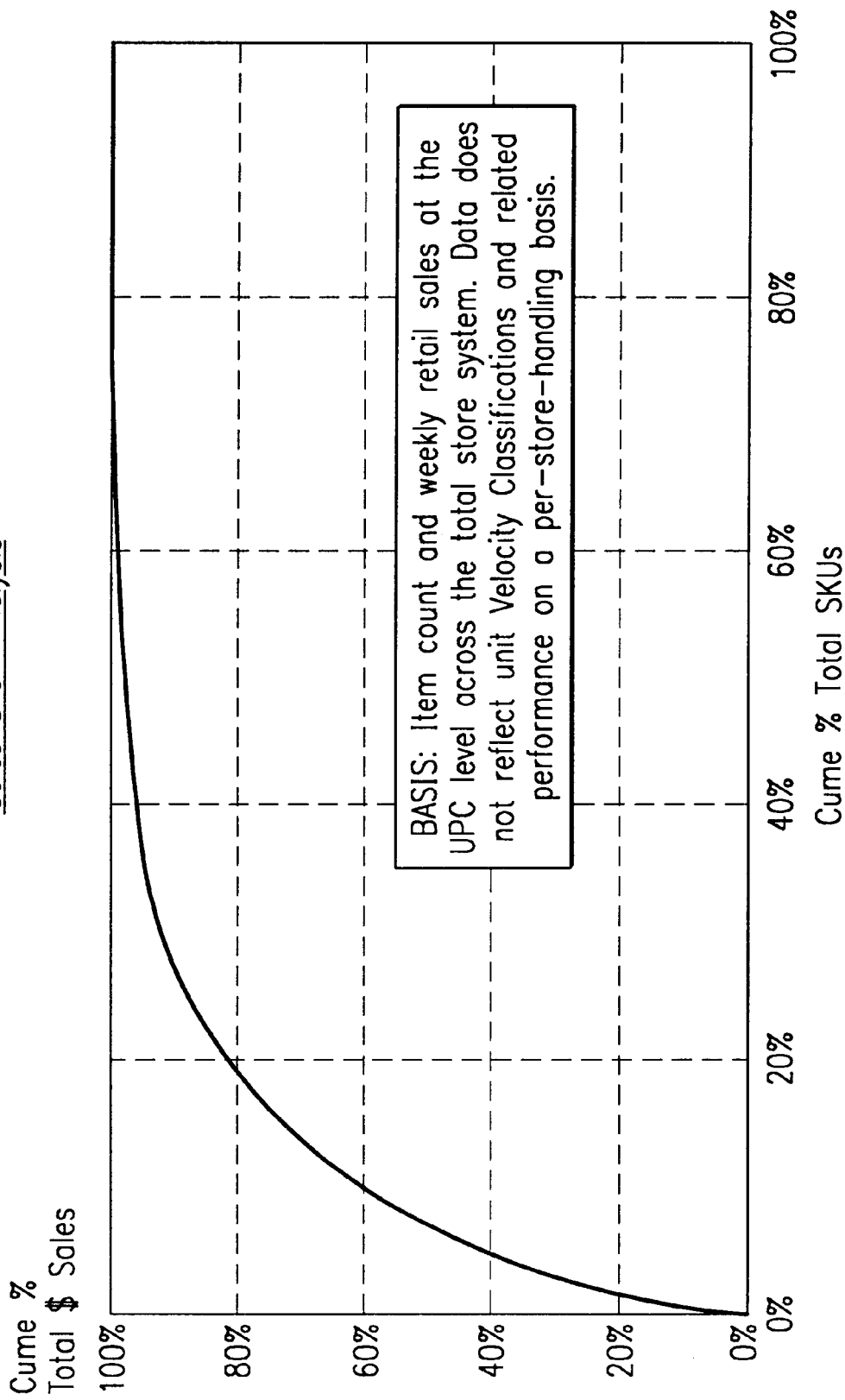
FIG. 32 is the sales skew analysis which shows the cumulative sales totals for the most to least popular products carried by a store, a chain, or in a geographic market.

FIG. 28 is a detailed final chart for velocity class of salty snack items and FIG. 29 is the detailed final chart for velocity class for salty snacks per store handling. FIG. 30 is the detailed final report for velocity class analysis with food products broken out by subcategory whereas FIG. 31 is the detailed final report for velocity class analysis with a breakout analysis by manufacturer. FIG. 32 is the curve showing cumulative percent of sales dollars versus cumulative percent of total items. FIG. 32 emphasizes the fact that the top seventy-five percent (75%) of sales revenue is captured by the top twenty percent (20%) of products. The bottom sixty percent, on the other hand, covers only ten percent of available products.

Figure 33:
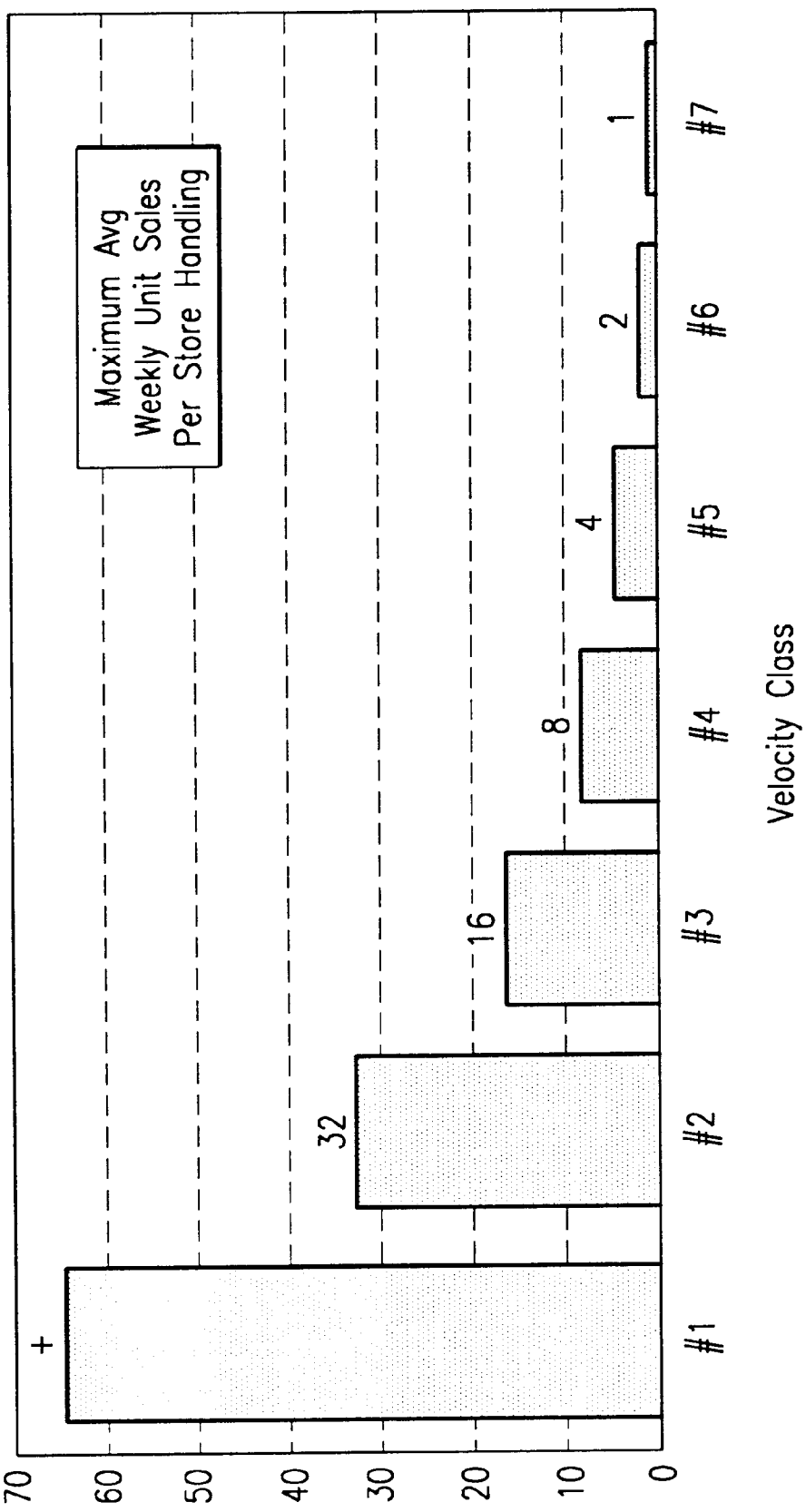
FIG. 33 is the bar chart for the velocity class analysis.
Figure 34:
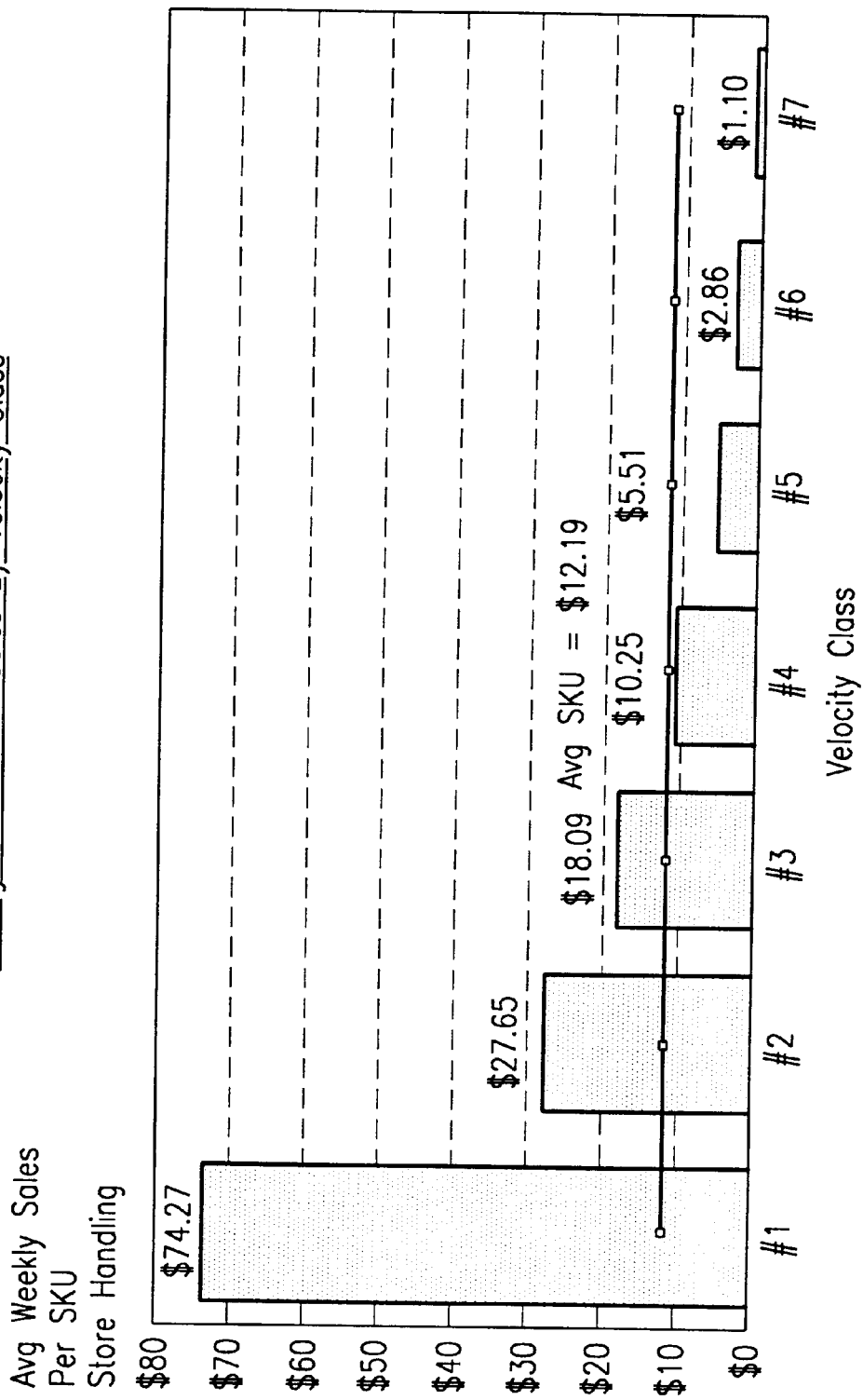
FIG. 34 is the bar chart for average item sales by velocity class with overlaid total average item sales information.
Figure 35:
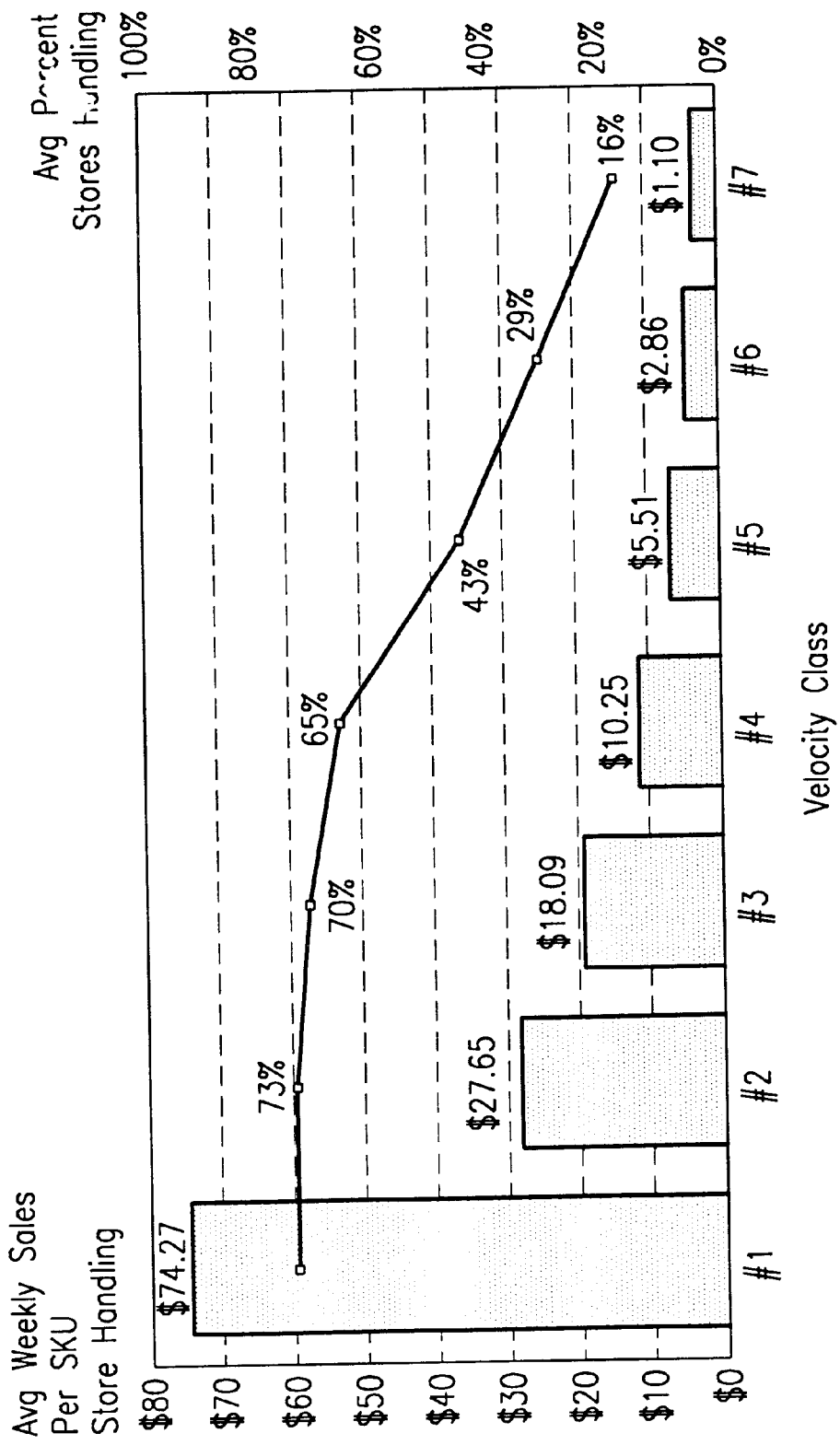
FIG. 35 is the bar chart for average weekly sales of item per store handling by velocity class with overlaid average percent of stores handling information.
Figure 36:
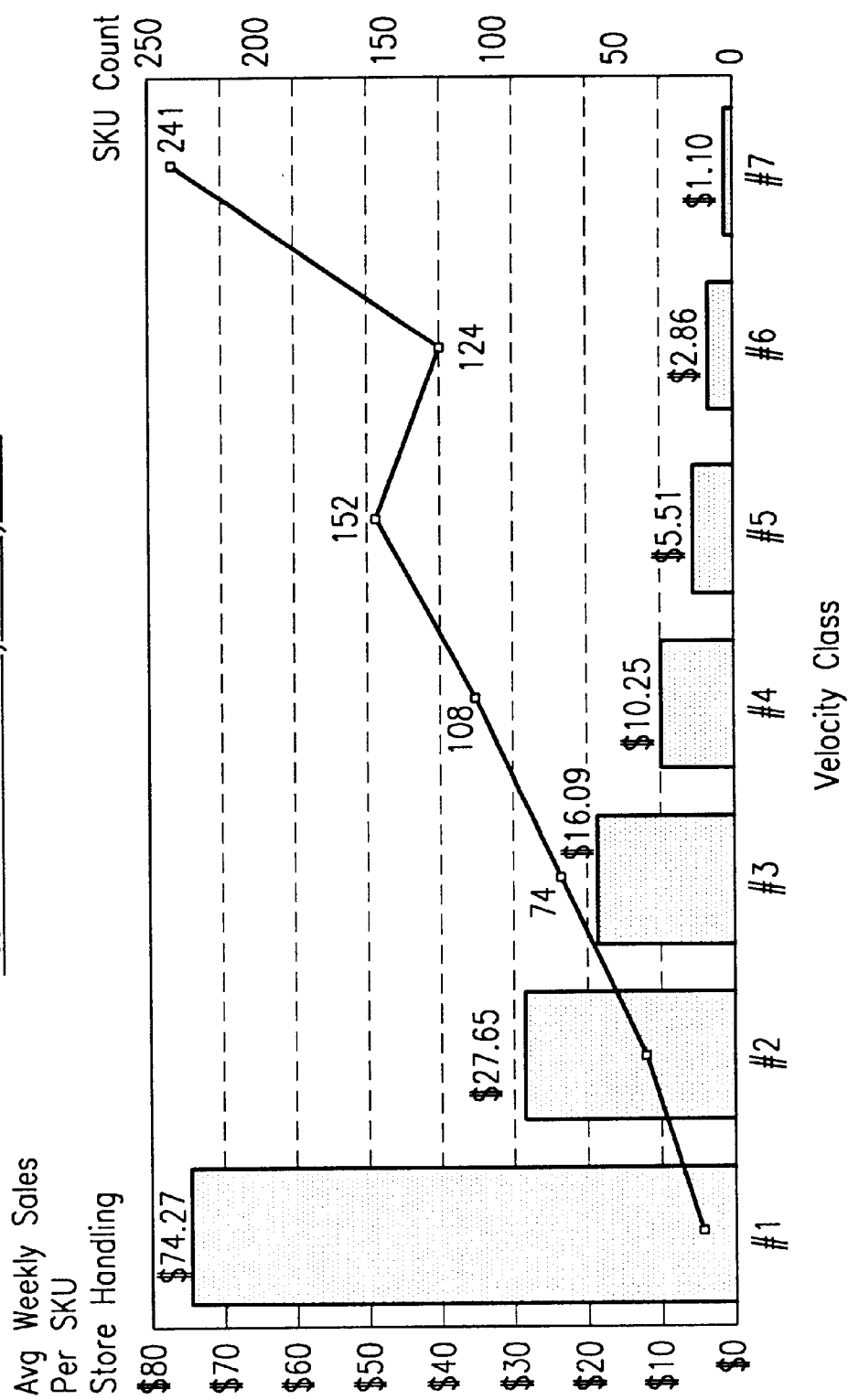
FIG. 36 is the bar chart for average weekly sales of item per store handling by velocity class with overlaid item count information.

FIG. 33 is a single bar chart showing the velocity class analysis. FIGS. 34–36 show variations of the bar charts with values attached to various bars in the chart. FIG. 34 is the velocity class analysis with value of weekly sales per item per store handling and the average weekly sales of an item per store handling. FIG. 35 is the same as FIG. 34 except the overlaid information includes average percentage of stores handling for each velocity class. FIG. 36, like FIGS. 34 and 35, includes the velocity class analysis, but also includes item counts in each velocity class.

Figure 37:
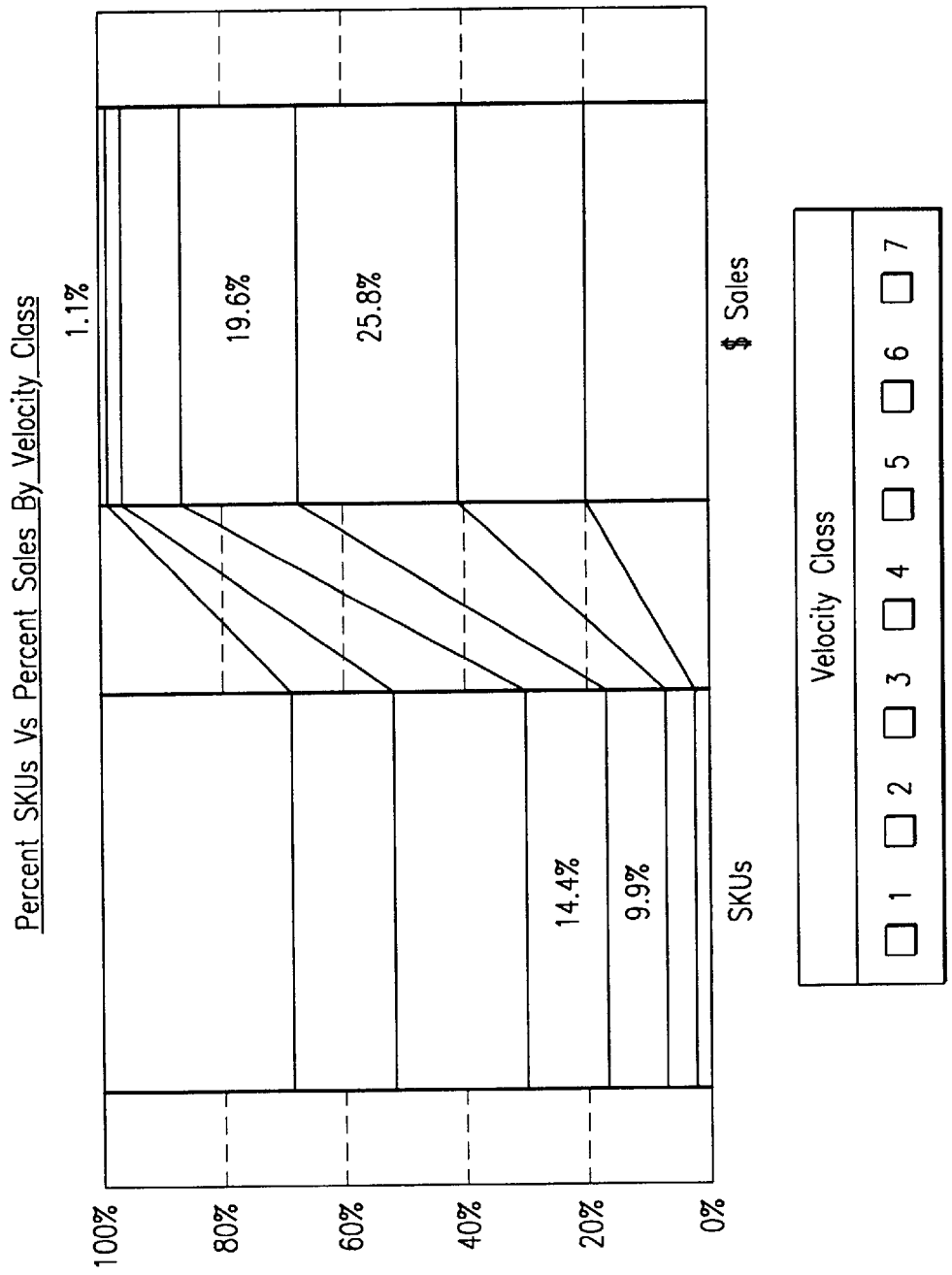
FIG. 37 is the bar chart for percent items carried versus percent sales by velocity class.

FIG. 37 is a bar chart which shows percentage of items versus percentage of sales by velocity class. This chart shows how the largest percentage of items (26.2%) are in Class 7, yet these Class 7 items account for less than one percent of the sales. The Class 1 items, however, comprise the lowest percentage of items (6.7%), yet the highest percentage of sales volume (39.3%).

FIG. 38 is a detailed final report for all products including velocity classification, per store handling weekly sales and total per store handling sales. After step 1340, the program operation will proceed to step 1350 and return to the main menu.

As disclosed in FIG. 11, the assortment planning analysis begins at step 1370 and proceeds to step 1380 where the user may enter a scenario name. Each scenario will attempt to find out the revenues for alternative assortments. The assortment planner allows the program user to add, or delete items from the assortment. Using retail sales data, the program can make estimates of higher or lower revenues based upon the adjusted assortment.

After step 1380, the program operation proceeds to step 1390 where the user may select or designate a segment name. After step 1390, the program operation will proceed to step 1400 where the user may indicate its desire to display all items. If the answer is YES at step 1400, the program operation proceeds to step 1410 where the user may select all items. The output screen 3100 in FIG. 19 is an example of this selection. After step 1410, the program operation proceeds to step 1415 where the program operation will proceed to step (g) at step 1375.

If the answer is NO at step 1400, the program operation will proceed to step 1420 where the user may indicate its desire to display added items. If the answer is YES at step 1420, the user may indicate which items to add at step 1430. The output screen 3200 in FIG. 20 is an example of this selection. After step 1430, the program operation will proceed to step 1435 where the program operation will proceed to step (g) at step 1375.

If the answer is NO at step 1420, the program operation will proceed to step 1440 where the user may indicate its desire to display deleted or de-listed items. If the answer is YES at step 1440, the program operation will proceed to step 1450 where the user may indicate the items to delete or de-list. The output screen 3300 in FIG. 21 is an example of this selection. After step 1450, the program operation will proceed to step 1460 where the program operation will proceed to step (g) at step 1375.

If the answer is NO at step 1440, the program operation will proceed to step 1470 where the user may indicate its desire to display stock items. If the answer is YES at step 1470, the program user may select the stock items. After step 1480, the program operation will proceed to step 1490 where the program operation will proceed to step (g) at step 1375.

If the answer is NO at step 1470, the program operation will proceed to step 1500 where the user may indicate its desire to display non-stock items. If the answer is YES at step 1500, the program operation will proceed to step 1550 where the user may select non-stock items. After step 1550, the program operation will proceed to step 1560 where the program operation will proceed to step (g) at step 1375. If the answer is NO at step 1500, the program operation will proceed to step 1570 where the program operation will proceed at step (h).

Figure 12:
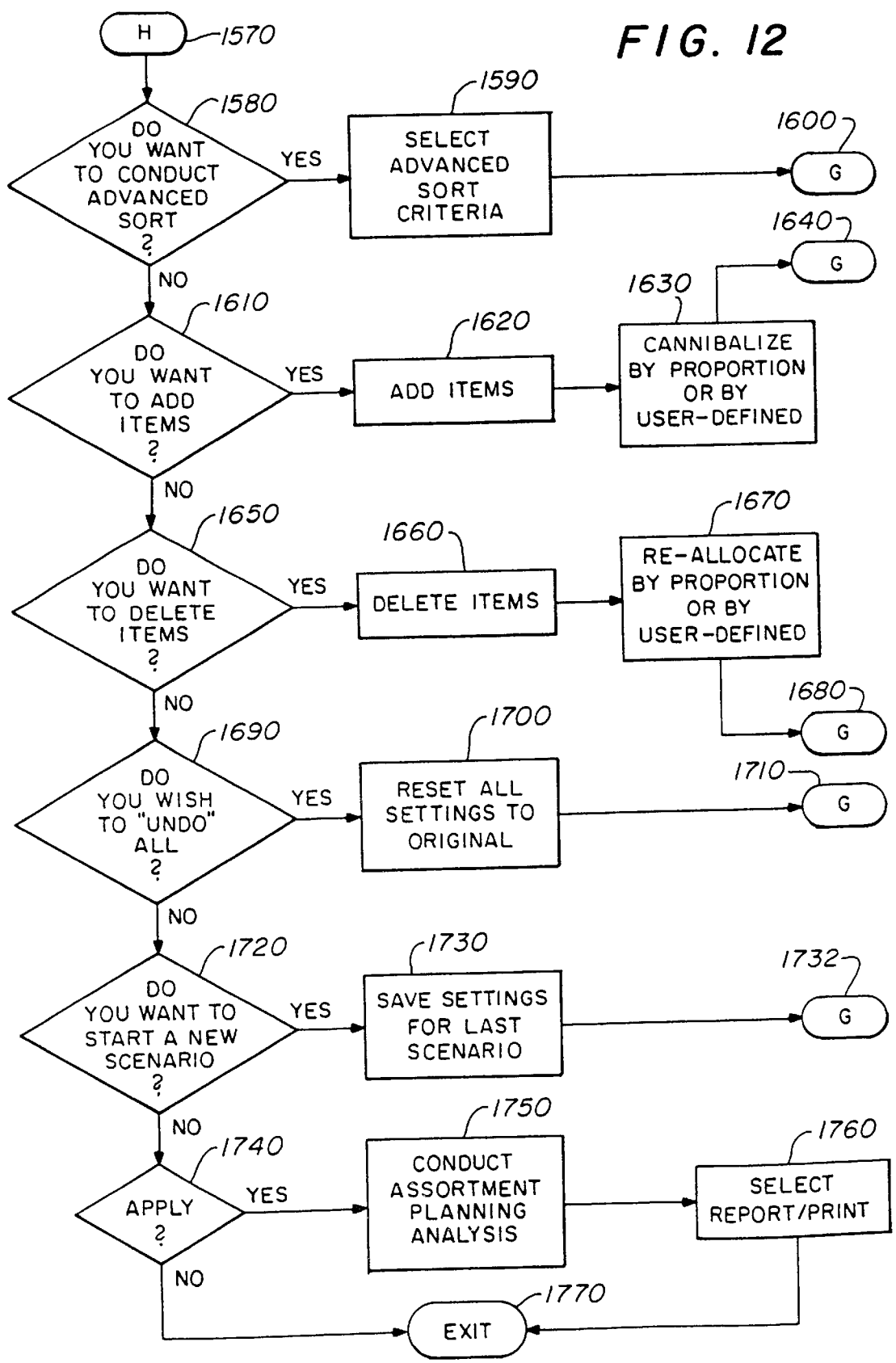
FIG. 12 is the second page of a flowchart for assortment planning analysis.

The assortment planner analysis continues on FIG. 12, beginning at step (h) at step 1570. After step 1570, the program operation will proceed at step 1580 where the user may indicate a desire to conduct an advanced sorting routine. If the answer is YES at step 1580, the program operation will proceed to step 1590 where the user may select the advanced sorting criteria. After step 1590, the program operation will proceed to step 1600 where the program operation will proceed to step (g) at step 1375.

If the answer is NO at step 1580, the program operation will proceed to step 1610 where the user may indicate its desire to add certain items to the assortment planning analysis. If the answer is YES at step 1610, the program operation will proceed to step 1620 where the user may indicate the items to be added. After step 1620, the program operation will proceed to step 1630 where the user may select either a proportional or user-defined cannibalization.

When adding a product to the assortment, the program recognizes the fact that total sales may increase subject to user defined settings. When a product is added to the assortment, the sales for the added product may decrease the total sales for the other products in the assortment. In order to support the added product, the sales devoted to the other products in the assortment can be lowered, or cannibalized. This cannibalization will devote a portion of sales from other items in the assortment toward sales for added items in the product segment.

Cannibalization may be user defined where the user dictates that the total sales are decreased for the items in the assortment. The cannibalization can be proportional where the most popular items are decreased by the most amount of sales down to the least popular items. After step 1630, the program operation will proceed to step 1640 where the program operation will proceed to step (g) at step 1375.

If the answer is NO at step 1610, the program operation will proceed to step 1650 where the user may indicate its desire to delete items from the assortment analysis. If the answer is YES at step 1650, the user may define and specify the items to be deleted from the assortment plan analysis at step 1660. After step 1660, the program operation will proceed to step 1670 where the user may select either a proportional or a user-defined reallocation of the sales which have been vacated by the deleted items.

When de-listing a product from the assortment, an assumption is made in the assortment analysis that overall sales spent for all products will remain unchanged. Accordingly, regardless of the assortment of products, the overall sales will not increase or decrease. Using the assumption that total sales for products in the store chain will remain unchanged, once items are deleted from the assortment, an excess amount of sales will remain undevoted to the products remaining in the assortment. In order to allocate this excess amount of sales to products, the user may define how money spent on the deleted items will be reallocated to other items in the assortment. The user may also select the reallocation of sales in a proportional setting which will accommodate allocation of sales to the items in a proportional sense based on their popularity. In the proportional reallocation, the most popular items would get the most sales allocation down to the least popular items. After step 1670, the program operation will proceed to step 1680 where the program operation will proceed to step (g) at step 1375.

If the answer is NO at step 1650, the program operation will proceed to step 1690 where the user may indicate a desire to undo all of the selected assortment criteria from the assortment planner. If the answer is YES at step 1690, the program operation will proceed to step 1700 where the program will reset all settings to the original scenario settings. After step 1700, the program operation will proceed to step 1710 where the program operation will proceed to step (g) at step 1375.

If the answer is NO at step 1690, the program operation will proceed to step 1720 where the user may indicate its desire to start a new scenario. If the answer is YES at step 1720, the program operation will proceed to step 1730 where the settings for the old scenario will be saved and the program operation will proceed to step 1732 where the program operation will go to step (g) at step 1375. If the answer is NO at step 1720, the program operation will proceed to step 1740 where the user may indicate whether it wishes to apply the criteria for the assortment analysis. If the answer is YES at step 1740, the program operation will proceed to step 1750 where the assortment plan analysis will be conducted. After step 1750, the program operation will proceed to step 1760 where the user may select the report for viewing or printing.

FIGS. 39–41 provide detailed final reports on the assortment planner analysis. A detailed final report for alternative scenario #1 with velocity classification and descriptions of the products may be provided as previously described, or FIG. 39 shows the impact on revenues for categories based on alternative scenario #1 in a tabular box output chart. FIG. 40 provides projected results of the assortment planner scenario #1 for market coverage analysis. FIG. 41 provides detailed analysis for projected weekly sales for alternative scenario #1. After step 1760, the program operation will proceed to step 1770 for exit from the assortment planning analysis. If the answer is NO at step 1740, the program operation will proceed to step 1770 for exit of the assortment planning analysis.

If desired, the system can analyze chain data without market data. This embodiment is useful in analyzing chain data where market data may omit several stores in the chain. For instance, market data for the Denver area may not include certain suburb chain locations outside the metropolitan Denver area. In this situation, chain data may include these stores and the data may be analyzed with respect to the chain of stores without examining the more restrictive geographic market area.

In this alternative embodiment, all functions of the system operate in the manner described above except no market data is available and market coverage analysis cannot be conducted. Further, the system will not accommodate analysis regarding the addition of items to the assortment.

Although more than one embodiment of the invention has been described, it will be appreciated by those skilled in the art that various modifications to the details of the method and system shown and described may be made without departing from the scope of this invention.

What is claimed is:

1. A method for optimizing a retail product assortment carried by a store comprising the steps of:

providing a plurality of retail sales data for a plurality of retail products in a market;

categorizing the retail sales data into at least one product category segment for analysis;

determining market coverage of at least one product in the retail product assortment carried by the store;

classifying an average throughput of at least one of the products in the retail product assortment carried by the store; and, analyzing at least one variation in the retail product assortment carried by the store.

2. The optimizing method according to claim 1 wherein said retail sales data includes data for a chain of stores.

3. The optimizing method according to claim 1 wherein said retail sales data includes data for a geographic region.

4. The optimizing method according to claim 1 wherein said retail sales data includes data for a chain of stores and a geographic region.

5. The optimizing method according to claim 1 further comprising the step of:

excluding at least one product component during the categorizing step.

6. The optimizing method according to claim 1 further comprising the step of:

including at least one product component during the categorizing step.

7. The optimizing method according to claim 1 further comprising the step of:

combining a plurality of product components during the categorizing step.

8. The optimizing method of claims 5, 6 or 7 wherein a product component includes one of the following:

a product type, a product container size, or a product container type.

9. The optimizing method according to claim 1 further comprising the step of:

calculating the percent product coverage to determine the market coverage of the products in the retail product assortment carried by the store wherein percent product coverage is defined as $(a/b)*100$, where a equals the number of items in a product segment carried by the store and b equals the total items in the product segment in the market.

10. The optimizing method according to claim 1 further comprising the step of:

calculating the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

11. The optimizing method according to claim 1 further comprising the steps of:

calculating the percent product coverage to determine the market coverage of the products in the retail product assortment carried by the store wherein percent product coverage is defined as (a/b)*100, where a equals the number of items in a product segment carried by the store and b equals the total items in the product segment in the market; and calculating the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

12. The optimizing method according to claim 1 wherein:

a plurality of unique classification values are used to classify the average throughput of the products in the retail product assortment carried by the store.

13. The optimizing method according to claim 12 wherein:

the plurality of unique classification values may be modified by the number of classification values.

14. The optimizing method according to claim 12 wherein:

the plurality of unique classification values may be modified by the range of throughput of the classification.

15. The optimizing method according to claim 1 further comprising the step of:

adding an item to the retail product assortment carried by the store to analyze at least one variation in the retail product assortment carried by the store.

16. The optimizing method according to claim 1 further comprising the step of:

deleting an item to the retail product assortment carried by the store to analyze at least one variation in the retail product assortment carried by the store.

17. A computer-implemented method for optimizing a retail product assortment carried by a store comprising the steps of:

providing a plurality of retail sales data for a plurality of retail products in a market, categorizing the retail sales data in to at least one product category segment for analysis, and using the categorized data to assist in optimizing a retail product assortment.

18. The optimizing method according to claim 17 wherein said retail sales data includes data for a chain of stores.

19. The optimizing method according to claim 17 wherein said retail sales data includes data for a geographic region.

20. The optimizing method according to claim 17 wherein said retail sales data includes data for a chain of stores and a geographic region.

21. The optimizing method according to claim 17 further comprising the steps of:

excluding at least one product component during the categorizing step.

22. The optimizing method according to claim 17 further comprising the steps of:

including at least one product component during the categorizing step.

23. The optimizing method according to claim 17 further comprising the steps of:

combining a plurality of product components during the categorizing step.

24. The optimizing method of claims 21, 22, or 23 wherein a product component includes one of the following:

a product type, a product container size, or a product container type.

25. A method for optimizing a retail product assortment carried by a store comprising the steps of:

providing a plurality of retail sales data for a plurality of retail products in a market;

determining market coverage of the products in the retail product assortment carried by the store; and, analyzing at least one variation in the retail product assortment carried by the store.

26. The optimizing method according to claim 25 wherein said retail sales data includes data for a chain of stores.

27. The optimizing method according to claim 25 wherein said retail sales data includes data for a geographic region.

28. The optimizing method according to claim 25 wherein said retail sales data includes data for a chain of stores and a geographic region.

29. The optimizing method according to claim 25 further comprising the step of:

calculating the percent product coverage to determine the market coverage of the products in the retail product assortment carried by the store wherein percent product coverage is defined as (a/b)*100, where a equals the number of items in a product segment carried by the store and b equals the total items in the product segment in the market.

30. The optimizing method according to claim 25 further comprising the step of:

calculating the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

31. The optimizing method according to claim 25 further comprising the steps of:

calculating the percent product coverage to determine the market coverage of the products in the retail product assortment carried by the store wherein percent product coverage is defined as (a/b)*100, where a equals the number of items in a product segment carried by the store and b equals the total items in the product segment in the market; and, calculating the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

32. The optimizing method according to claim 25 further comprising the step of:

adding an item to the retail product assortment carried by the store to analyze at least one variation in the retail product assortment carried by the store.

33. The optimizing method according to claim 25 further comprising the step of:
  deleting an item to the retail product assortment carried by the store to analyze at least one variation in the retail product assortment carried by the store.

34. A method for optimizing a retail product assortment carried by a store comprising the steps of:
  classifying an average throughput of at least one product in the retail product assortment carried by the store according to retail sales data related to the products in the retail product assortment; and,
  identifying a variation in the retail product assortment based upon the throughput classification assigned to a product in the market.

35. The optimizing method according to claim 34 wherein said retail sales data includes data for a chain of stores.

36. The optimizing method according to claim 34 wherein said retail sales data includes data for a geographic region.

37. The optimizing method according to claim 34 wherein said retail sales data includes data for a chain of stores and a geographic region.

38. The optimizing method according to claim 34 wherein:
  a plurality of unique classification values are used to classify the average throughput of the products in the retail product assortment carried by the store.

39. The optimizing method according to claim 34 wherein:
  the plurality of unique classification values may be modified by the number of classification values.

40. The optimizing method according to claim 34 wherein:
  the plurality of unique classification values may be modified by the range of throughput of the classification.

41. The optimizing method according to claim 34 further comprising the step of:
  adding an item to the retail product assortment carried by the store to analyze at least one variation in the retail product assortment carried by the store.

42. The optimizing method according to claim 34 further comprising the step of:
  deleting an item to the retail product assortment carried by the store to analyze at least one variation in the retail product assortment carried by the store.

43. A method for categorizing segments of a product market, comprising the steps of:
  providing a plurality of retail sales data for a plurality of retail products in a market; and,
  performing one of the following steps:
    excluding a product component from the product category;
    including a product component from the product category; or,
    combining product components into the product category.

44. The categorizing method according to claim 43 wherein said retail sales data includes data for a chain of stores.

45. The categorizing method according to claim 43 wherein said retail sales data includes data for a geographic region.

46. The categorizing method according to claim 43 wherein said retail sales data includes data for a chain of stores and a geographic region.

47. The categorizing method of claim 43 wherein the product component includes one of the following:
  a product type,
  a product container size, or
  a product container type.

48. A method for determining the market coverage of a retail product assortment carried by a store, comprising the steps of:
  providing a plurality of retail sales data for a plurality of retail products in a market; and,
  determining market coverage of at least one product in the retail product assortment carried by the store.

49. The determination method according to claim 48 wherein said retail sales data includes data for a chain of stores.

50. The determination method according to claim 48 wherein said retail sales data includes data for a geographic region.

51. The determination method according to claim 48 wherein said retail sales data includes data for a chain of stores and a geographic region.

52. The determination method according to claim 48 further comprising the step of:
  calculating the percent product coverage to determine the market coverage of the products in the retail product assortment carried by the store wherein percent product coverage is defined as $(a/b)*100$, where a equals the number of items in a product segment carried by the store and b equals the total items in the product segment in the market.

53. The determination method according to claim 48 further comprising the step of:
  calculating the market demand to determine market coverage of the products in the retail product assortment carried by the store wherein market demand is defined as $(c/d)*100$, where c equals the sales revenue generated by the items in a product segment carried by the store and d equals the total sales revenue generated by the items in the product segment in the market.

54. The determination method according to claim 48 further comprising the steps of:
  calculating the percent product coverage to determine the market coverage of the products in the retail product assortment carried by the store wherein percent product coverage is defined as $(a/b)*100$, where a equals the number of items in a product segment carried by the store and b equals the total items in the product segment in the market; and
  calculating the market demand to determine market coverage of the products in the retail product assortment carried by the store wherein market demand is defined as $(c/d)*100$, where c equals the sales revenue generated by the items in a product segment carried by the store and d equals the total sales revenue generated by the items in the product segment in the market.

55. A method for determining a throughput classification of a product, comprising the steps of:
  providing a plurality of retail sales data for a plurality of retail products in a market; and,
  classifying an average throughput of the products in the retail product assortment carried by the store based upon the plurality of retail sales data.

56. The determination method according to claim 55 wherein said retail sales data includes data for a chain of stores.

57. The determination method according to claim 55 wherein said retail sales data includes data for a geographic region.

58. The determination method according to claim 55 wherein said retail sales data includes data for a chain of stores and a geographic region.

59. The determination method according to claim 55 wherein:
a plurality of unique classification values are used to classify the average throughput of the products in the retail product assortment carried by the store.

60. The determination method according to claim 59 wherein:
the plurality of unique classification values may be modified by the number of classification values.

61. The determination method according to claim 59 wherein:
the plurality of unique classification values may be modified by the range of throughput of the classification.

62. A method for optimizing an assortment of retail products, comprising the steps of:
providing a plurality of retail sales data for a plurality of retail products in a market;
classifying an average throughput of at least one product in the retail product assortment carried by the store;
analyzing at least one variation in the retail product assortment carried by the store.

63. The optimizing method according to claim 62 wherein said retail sales data includes data for a chain of stores.

64. The optimizing method according to claim 62 wherein said retail sales data includes data for a geographic region.

65. The optimizing method according to claim 62 wherein said retail sales data includes data for a chain of stores and a geographic region.

66. The optimizing method according to claim 62 further comprising the steps of:
determining market coverage of at least one product in the retail product assortment carried by the store.

67. The optimizing method according to claim 66 further comprising the step of:
calculating the percent product coverage to determine the market coverage of the products in the retail product assortment carried by the store wherein percent product coverage is defined as (a/b)*100, where a equals the number of items in a product segment carried by the store and b equals the total items in the product segment in the market.

68. The optimizing method according to claim 66 further comprising the step of:
calculating the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

69. The optimizing method according to claim 66 further comprising the steps of:
calculating the percent product coverage to determine the market coverage of the products in the retail product assortment carried by the store wherein percent product coverage is defined as (a/b)*100, where a equals the number of items in a product segment carried by the store and b equals the total items in the product segment in the market; and
calculating the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

70. The optimizing method according to claim 62 wherein:
a plurality of unique classification values are used to classify the average throughput of the products in the retail product assortment carried by the store.

71. The optimizing method according to claim 70 wherein:
the plurality of unique classification values may be modified by the number of classification values.

72. The optimizing method according to claim 70 wherein:
the plurality of unique classification values may be modified by the range of throughput of the classification.

73. The optimizing method according to claim 62 further comprising the step of:
adding an item to the retail product assortment carried by the store to analyze at least one variation in the retail product assortment carried by the store.

74. The optimizing method according to claim 62 further comprising the step of:
deleting an item to the retail product assortment carried by the store to analyze at least one variation in the retail product assortment carried by the store.

75. A computer-based system stored in a software storage medium for optimizing a retail product assortment carried by a store comprising:
a database having a plurality of retail sales data for a market;
a product segment categorizer which manipulates the retail sales data in the database into at least one product category segment for analysis;
a market coverage analyzer which determines a market coverage of at least one retail product carried by the store;
an average throughput classifier which classifies an average throughput of at least one product in the retail product assortment carried by the store; and,
an alternative assortment analyzer which analyzes at least one variation in the retail product assortment carried by the store.

76. The system according to claim 75 wherein said database includes data for a chain of stores.

77. The system according to claim 75 wherein said database includes data for a geographic region.

78. The system according to claim 75 wherein said database includes data for a chain of stores and a geographic region.

79. The system according to claim 75 wherein the categorizer excludes at least one product component during the categorization of data in the database.

80. The system according to claim 75 wherein the categorizer includes at least one product component during the categorization of data in the database.

81. The system according to claim 75 wherein the categorizer combines a plurality of product components during the categorization of data in the database.

82. The system according to claims 79, 80, or 81 wherein the product component includes one of the following:
a product type,
a product container size, or
a product container type.

83. The system according to claim 75 wherein the market coverage analyzer calculates the percent product coverage to determine the market coverage of the products in the retail product assortment carried by the store wherein percent product coverage is defined as (a/b)*100, where a equals the number of items in a product segment carried by the store and b equals the total items in the product segment in the market.

84. The system according to claim 75 wherein the market coverage analyzer calculates the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

85. The system according to claim 75 wherein the market coverage analyzer calculates the percent product coverage to determine the market coverage of the products in the retail product assortment carried by the store wherein percent product coverage is defined as (a/b)*100, where a equals the number of items in a product segment carried by the store and b equals the total items in the product segment in the market, and
the market coverage analyzer calculates the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

86. The system according to claim 75 wherein the average throughput classifier uses a plurality of unique classification values to classify the average throughput of at least one product in the retail product assortment carried by the store.

87. The system according to claim 86 wherein the plurality of unique classification values may be modified by the number of classification values.

88. The system according to claim 86 wherein the plurality of unique classification values may be modified by the range of throughput of the classification.

89. The system according to claim 75 wherein said an alternative assortment analyzer calculates impact of adding an item to the retail product assortment carried by the store in order to analyze at least one variation in the retail product assortment carried by the store.

90. The system according to claim 75 wherein said an alternative assortment analyzer calculates impact of deleting an item to the retail product assortment carried by the store in order to analyze at least one variation in the retail product assortment carried by the store.

91. A computer-based system stored in a software storage medium for optimizing a retail product assortment carried by a store comprising:
a database having a plurality of retail sales data for a market;
a product segment categorizer which manipulates the retail sales data in the database into at least one product category segment for analysis.

92. The system according to claim 91 wherein said database includes data for a chain of stores.

93. The system according to claim 91 wherein said database includes data for a geographic region.

94. The system according to claim 91 wherein said database includes data for a chain of stores and a geographic region.

95. The system according to claim 91 wherein the categorizer excludes at least one product component during the categorization of data in the database.

96. The system according to claim 91 wherein the categorizer includes at least one product component during the categorization of data in the database.

97. The system according to claim 91 wherein the categorizer combines a plurality of product components during categorization of data in the database.

98. The system according to claims 95, 96, or 97 wherein the product component includes one of the following:
a product type,
a product container size, or
a product container type.

99. A computer-based system stored in a software storage medium for optimizing a retail product assortment carried by a store comprising:
a database having a plurality of retail sales data for a market;
a market coverage analyzer which determines the market coverage of the retail products carried by the store; and,
an alternative assortment analyzer which analyzes at least one variation in the retail product assortment carried by the store.

100. The system according to claim 99 wherein said database includes data for a chain of stores.

101. The system according to claim 99 wherein said database includes data for a geographic region.

102. The system according to claim 99 wherein said database includes data for a chain of stores and a geographic region.

103. The system according to claim 99 wherein the market coverage analyzer calculates the percent product coverage to determine the market coverage of the products in the retail product assortment carried by the store wherein percent product coverage is defined as (a/b)*100, where a equals the number of items in a product segment carried by the store and b equals the total items in the product segment in the market.

104. The system according to claim 99 wherein the market coverage analyzer calculates the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

105. The system according to claim 99 wherein the market coverage analyzer calculates the percent product coverage to determine the market coverage of the products in the retail product assortment carried by the store wherein percent product coverage is defined as (a/b)*100, where a equals the number of items in a product segment carried by the store and b equals the total items in the product segment in the market, and
the market coverage analyzer calculates the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

106. The system according to claim 99 wherein said an alternative assortment analyzer calculates impact of deleting an item to the retail product assortment carried by the store in order to analyze at least one variation in the retail product assortment carried by the store.

107. The system according to claim 99 wherein said an alternative assortment analyzer calculates impact of adding an item to the retail product assortment carried by the store in order to analyze at least one variation in the retail product assortment carried by the store.

108. A computer-based system stored in a software storage medium for optimizing a retail product assortment carried by a store comprising:
 a database having a plurality of retail sales data for a market;
 an average throughput classifier which classifies the average throughput of at least one product in the retail product assortment carried by the store; and,
 an alternative assortment analyzer which analyzes at least one variation in the retail product assortment carried by the store.

109. The system according to claim 108 wherein said database includes data for a chain of stores.

110. The system according to claim 108 wherein said database includes data for a geographic region.

111. The system according to claim 108 wherein said database includes data for a chain of stores and a geographic region.

112. The system according to claim 108 wherein the average throughput classifier uses a plurality of unique classification values to classify the average throughput of the products in the retail product assortment carried by the store.

113. The system according to claim 112 wherein the plurality of unique classification values may be modified by the number of classification values.

114. The system according to claim 112 wherein the plurality of unique classification values may be modified by the range of throughput of the classification.

115. The system according to claim 108 wherein said an alternative assortment analyzer calculates impact of adding an item to the retail product assortment carried by the store in order to analyze at least one variation in the retail product assortment carried by the store.

116. The system according to claim 108 wherein said an alternative assortment analyzer calculates impact of deleting an item to the retail product assortment carried by the store in order to analyze at least one variation in the retail product assortment carried by the store.

117. A computer-based system stored in a software storage medium for optimizing a retail product assortment carried by a store comprising:
 a database having a plurality of retail sales data for a market; and
 a product segment categorizer which manipulates the retail sales data in the database into at least one product category segment for analysis by either adding, deleting or combining product components.

118. The system according to claim 117 wherein said database includes data for a chain of stores.

119. The system according to claim 117 wherein said database includes data for a geographic region.

120. The system according to claim 117 wherein said database includes data for a chain of stores and a geographic region.

121. The system according to claim 117 wherein the product component includes one of the following:
 a product type,
 a product container size, or
 a product container type.

122. The system according to claim 117 wherein the categorizer provides graphical or tabular display.

123. A computer-based system stored in a software storage medium for optimizing a retail product assortment carried by a store comprising:
 a database having a plurality of retail sales data for a market; and,
 a market coverage analyzer which determines a market coverage of at least one retail product carried by the store.

124. The system according to claim 123 wherein said database includes data for a chain of stores.

125. The system according to claim 123 wherein said database includes data for a geographic region.

126. The system according to claim 123 wherein said database includes data for a chain of stores and a geographic region.

127. The system according to claim 123 wherein the market coverage analyzer calculates the percent product coverage to determine the market coverage of the products in the retail product assortment carried by the store wherein percent product coverage is defined as (a/b)*100, where a equals the number of items in a product segment carried by the store and b equals the total items in the product segment in the market.

128. The system according to claim 123 wherein the market coverage analyzer calculates the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

129. The system according to claim 125 wherein the market coverage analyzer calculates the percent product coverage to determine the market coverage of the products in the retail product assortment carried by the store wherein percent product coverage is defined as (a/b)*100, where a equals the number of items in a product segment carried by the store and b equals the total items in the product segment in the market, and
 the market coverage analyzer calculates the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

130. A computer-based system stored in a software storage medium for optimizing a retail product assortment carried by a store comprising:
 a database having a plurality of retail sales data for a market; and
 an average throughput classifier which classifies an average throughput of a plurality of products in the retail product assortment carried by the store.

131. The system according to claim 130 wherein said database includes data for a chain of stores.

132. The system according to claim 130 wherein said database includes data for a geographic region.

133. The system according to claim 130 wherein said database includes data for a chain of stores and a geographic region.

134. The system according to claim 130 wherein the average throughput classifier uses a plurality of unique classification values to classify the average throughput of the products in the retail product assortment carried by the store.

135. The system according to claim 134 wherein the plurality of unique classification values may be modified by the number of classification values.

136. The system according to claim 134 wherein the plurality of unique classification values may be modified by the range of throughput of the classification.

137. A computer-based system stored in a software storage medium for optimizing a retail product assortment carried by a store comprising:

a database having a plurality of retail sales data for a market;

an average throughput classifier which classifies an average throughput of a plurality of products in the retail product assortment carried by the store; and, an alternative assortment analyzer which analyzes at least one variation in the retail product assortment carried by the store.

138. The system according to claim 137 wherein said database includes data for a chain of stores.

139. The system according to claim 137 wherein said database includes data for a geographic region.

140. The system according to claim 137 wherein said database includes data for a chain of stores and a geographic region.

141. The system according to claim 137 wherein the market coverage analyzer calculates the percent product coverage to determine the market coverage of the products in the retail product assortment carried by the store wherein percent product coverage is defined as (a/b)*100, where a equals the number of items in a product segment carried by the store and b equals the total items in the product segment in the market.

142. The system according to claim 137 wherein the market coverage analyzer calculates the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

143. The system according to claim 137 wherein the market coverage analyzer calculates the percent product coverage to determine the market coverage of the products in the retail product assortment carried by the store wherein percent product coverage is defined as (a/b)*100, where a equals the number of items in a product segment carried by the store and b equals the total items in the product segment in the market, and the market coverage analyzer calculates the market demand to determine market coverage of the products in the retail product assortment carried by the store wherein market demand is defined as (c/d)*100, where c equals the sales revenue generated by the items in a product segment carried by the store and d equals the total sales revenue generated by the items in the product segment in the market.

144. The system according to claim 137 wherein the average throughput classifier uses a plurality of unique classification values to classify the average throughput of the products in the retail product assortment carried by the store.

145. The system according to claim 144 wherein the plurality of unique classification values may be modified by the number of classification values.

146. The system according to claim 144 wherein the plurality of unique classification values may be modified by the range of throughput of the classification.

147. The system according to claim 137 wherein said an alternative assortment analyzer calculates impact of adding an item to the retail product assortment carried by the store in order to analyze at least one variation in the retail product assortment carried by the store.

148. The system according to claim 137 wherein said an alternative assortment analyzer calculates impact of deleting an item to the retail product assortment carried by the store in order to analyze at least one variation in the retail product assortment carried by the store.

* * * * *